(12) United States Patent
Maguire

(10) Patent No.: US 9,956,920 B2
(45) Date of Patent: May 1, 2018

(54) APPARATUS FOR MOUNTING AN ARTICLE TO A VEHICLE, AND AN ARTICLE FOR USE THEREWITH

(71) Applicant: AEROE SPORTS LIMITED, Dunedin (NZ)

(72) Inventor: Patrick David Maguire, Nelson (NZ)

(73) Assignee: AEROE SPORTS LIMITED, Dunedin (NZ)

( * ) Notice: Subject to any disclaimer, the term of this patent is extended or adjusted under 35 U.S.C. 154(b) by 102 days.

(21) Appl. No.: 15/030,212

(22) PCT Filed: Oct. 17, 2014

(86) PCT No.: PCT/NZ2014/050003
§ 371 (c)(1),
(2) Date: Apr. 18, 2016

(87) PCT Pub. No.: WO2015/057086
PCT Pub. Date: Apr. 23, 2015

(65) Prior Publication Data
US 2016/0236622 A1    Aug. 18, 2016

Related U.S. Application Data

(60) Provisional application No. 61/892,121, filed on Oct. 17, 2013.

(51) Int. Cl.
*B60R 9/00* (2006.01)
*B60R 9/045* (2006.01)
(Continued)

(52) U.S. Cl.
CPC .............. *B60R 9/045* (2013.01); *B60R 9/048* (2013.01); *B60R 9/06* (2013.01)

(58) Field of Classification Search
CPC ............ B60R 9/045; B60R 9/048; B60R 9/06
(Continued)

(56) References Cited

U.S. PATENT DOCUMENTS 2,788,929 A    4/1957  Gallagher
4,117,964 A *  10/1978 Sage ...................... B60R 9/055
                                                              220/668
(Continued)

FOREIGN PATENT DOCUMENTS

EP          1442938      8/2004
WO       2004/041596     5/2004

OTHER PUBLICATIONS

International Search Report PCT/NZ2014/050003 dated Mar. 12, 2015.
(Continued)

*Primary Examiner* — Peter Helvey
(74) *Attorney, Agent, or Firm* — Young & Thompson

(57) ABSTRACT

An apparatus 1 for attaching an article 3 to a vehicle 9, having a first engagement member 24 and a second engagement member 26 spaced from the first engagement member along a longitudinal axis and that is slidable relative to the first engagement member along the longitudinal axis between an engaged position and a disengaged position. The apparatus 1 has a transverse plane extending generally through the apparatus and coincident with the longitudinal axis. The first and second engagement members 24, 26 each have a retaining portion 24*b*, 26*b* that is non-perpendicular relative to the transverse plane and configured to be received by respective engagement features 103, 107 on the article 3.

19 Claims, 24 Drawing Sheets

(51) Int. Cl.
*B60R 9/048* (2006.01)
*B60R 9/06* (2006.01)

(58) Field of Classification Search
USPC .......................................................... 224/328
See application file for complete search history.

(56) References Cited

U.S. PATENT DOCUMENTS

| | | | | |
|---|---|---|---|---|
| 4,214,687 | A * | 7/1980 | Covell | B60R 9/12 |
| | | | | 211/70.5 |
| 4,717,132 | A * | 1/1988 | Yang | B23B 31/16275 |
| | | | | 269/258 |
| 4,726,597 | A | 2/1988 | Hickin | |
| 4,969,638 | A * | 11/1990 | Yang | B25B 1/2426 |
| | | | | 269/258 |
| 5,076,479 | A * | 12/1991 | Davison | B60R 9/045 |
| | | | | 211/49.1 |
| 5,226,570 | A * | 7/1993 | Pedrini | B60R 9/058 |
| | | | | 224/315 |
| 5,290,121 | A * | 3/1994 | Dolce | B25B 5/08 |
| | | | | 24/513 |
| 5,582,044 | A | 12/1996 | Bolich | |
| 6,152,435 | A * | 11/2000 | Snell | B25B 1/20 |
| | | | | 269/268 |
| 6,431,534 | B1 * | 8/2002 | Orosz | B25B 5/101 |
| | | | | 269/249 |
| 7,451,968 | B2 | 11/2008 | Geldert | |
| 7,487,895 | B2 | 2/2009 | Hesmer | |
| 7,669,723 | B2 * | 3/2010 | Kao | B25H 3/04 |
| | | | | 206/349 |
| 7,959,016 | B2 * | 6/2011 | Kao | A47F 5/0807 |
| | | | | 211/70.6 |
| 8,223,488 | B2 * | 7/2012 | Peter | E05B 73/0082 |
| | | | | 211/8 |
| 8,348,725 | B2 * | 1/2013 | Clay | B24B 41/06 |
| | | | | 269/218 |
| 8,376,343 | B2 * | 2/2013 | Yang | B01D 25/1275 |
| | | | | 269/254 CS |
| 8,540,197 | B1 * | 9/2013 | Krol, II | A63C 17/0006 |
| | | | | 211/DIG. 1 |
| 8,561,864 | B2 * | 10/2013 | Gisin | B60R 9/04 |
| | | | | 224/309 |
| 8,578,647 | B2 * | 11/2013 | Storch | F41C 27/00 |
| | | | | 248/187.1 |
| 8,601,840 | B2 * | 12/2013 | Lawrence | B60R 25/09 |
| | | | | 292/259 R |
| 8,701,263 | B2 * | 4/2014 | Okitsu | B60R 16/0222 |
| | | | | 29/235 |
| 8,837,144 | B1 * | 9/2014 | Allen | E05B 73/0082 |
| | | | | 211/8 |
| 8,939,297 | B2 * | 1/2015 | Berman | F16M 13/02 |
| | | | | 211/70.5 |
| 8,967,397 | B1 * | 3/2015 | Greenwald | A63B 71/0036 |
| | | | | 211/4 |
| 9,022,337 | B2 * | 5/2015 | Petruskavich | F16M 11/041 |
| | | | | 248/176.1 |
| 9,045,090 | B2 * | 6/2015 | Wilhelm | B60R 9/12 |
| D739,990 | S * | 9/2015 | Sautter | D34/16 |
| 9,291,304 | B1 * | 3/2016 | Tu | F16M 13/02 |
| 9,346,524 | B2 * | 5/2016 | Dubois | B63B 35/7946 |
| 9,429,269 | B2 * | 8/2016 | Wilhelm | F16B 2/08 |
| D789,687 | S * | 6/2017 | Sansone | D3/249 |
| 2002/0109282 | A1 * | 8/2002 | Peck | B25B 1/2442 |
| | | | | 269/258 |
| 2006/0032878 | A1 | 2/2006 | Settelmayer et al. | |
| 2012/0205410 | A1 | 8/2012 | Steckel | |

OTHER PUBLICATIONS

Written Opinion of the International Searching Authority PCT/NZ2014/050003 dated Mar. 12, 2015.

* cited by examiner

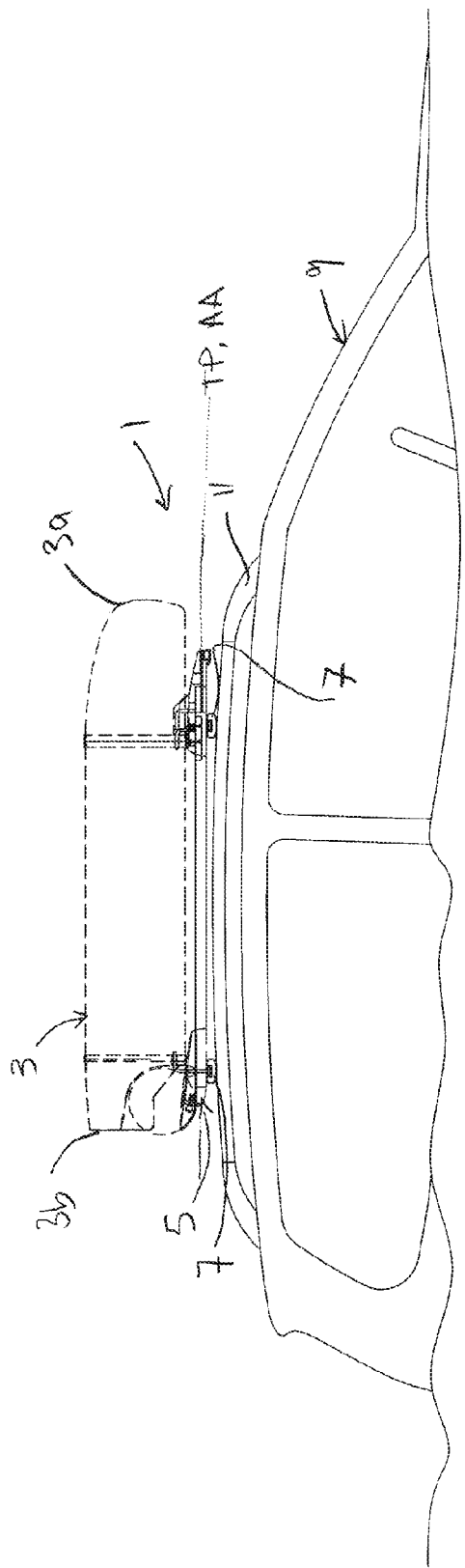

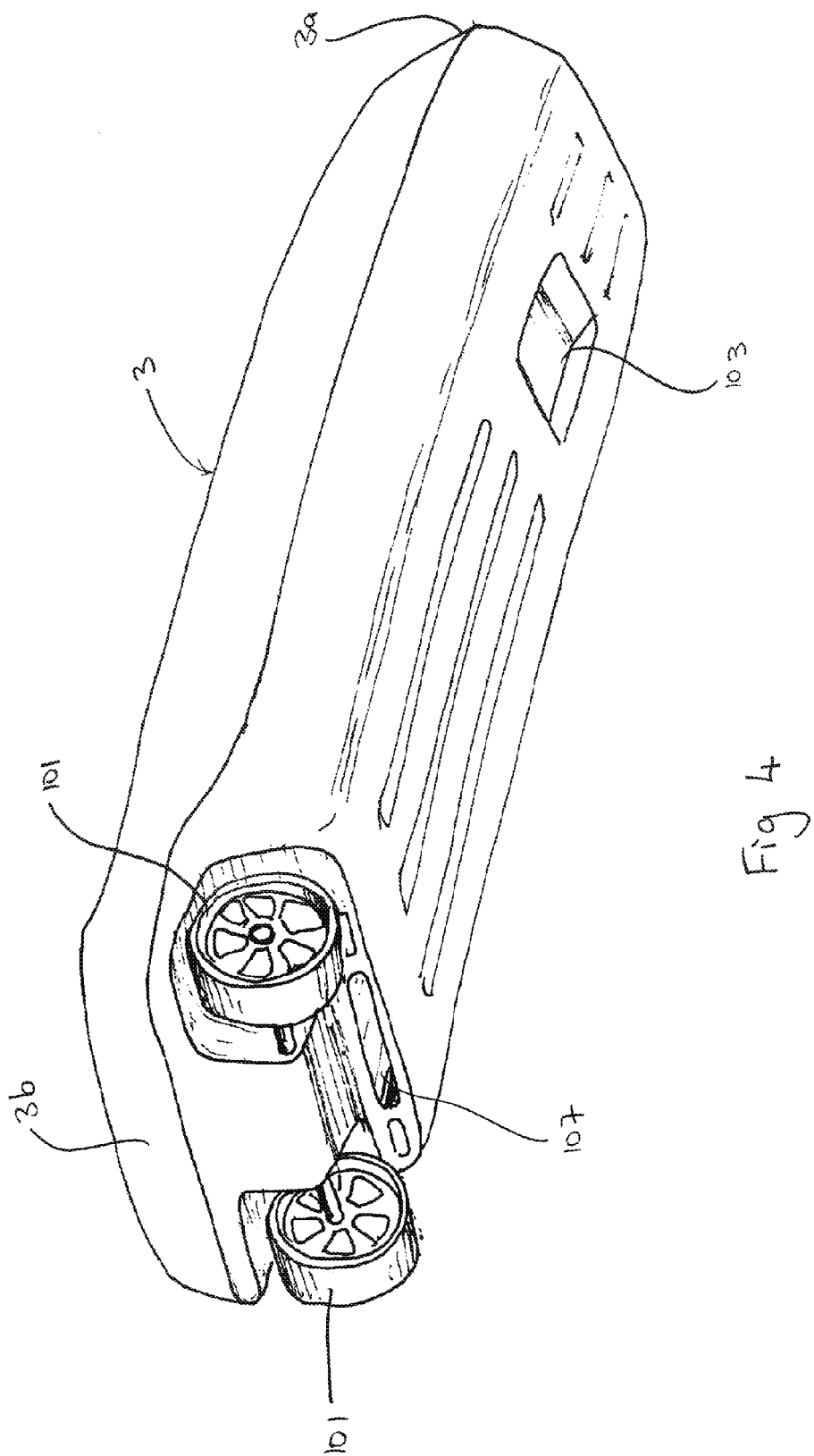

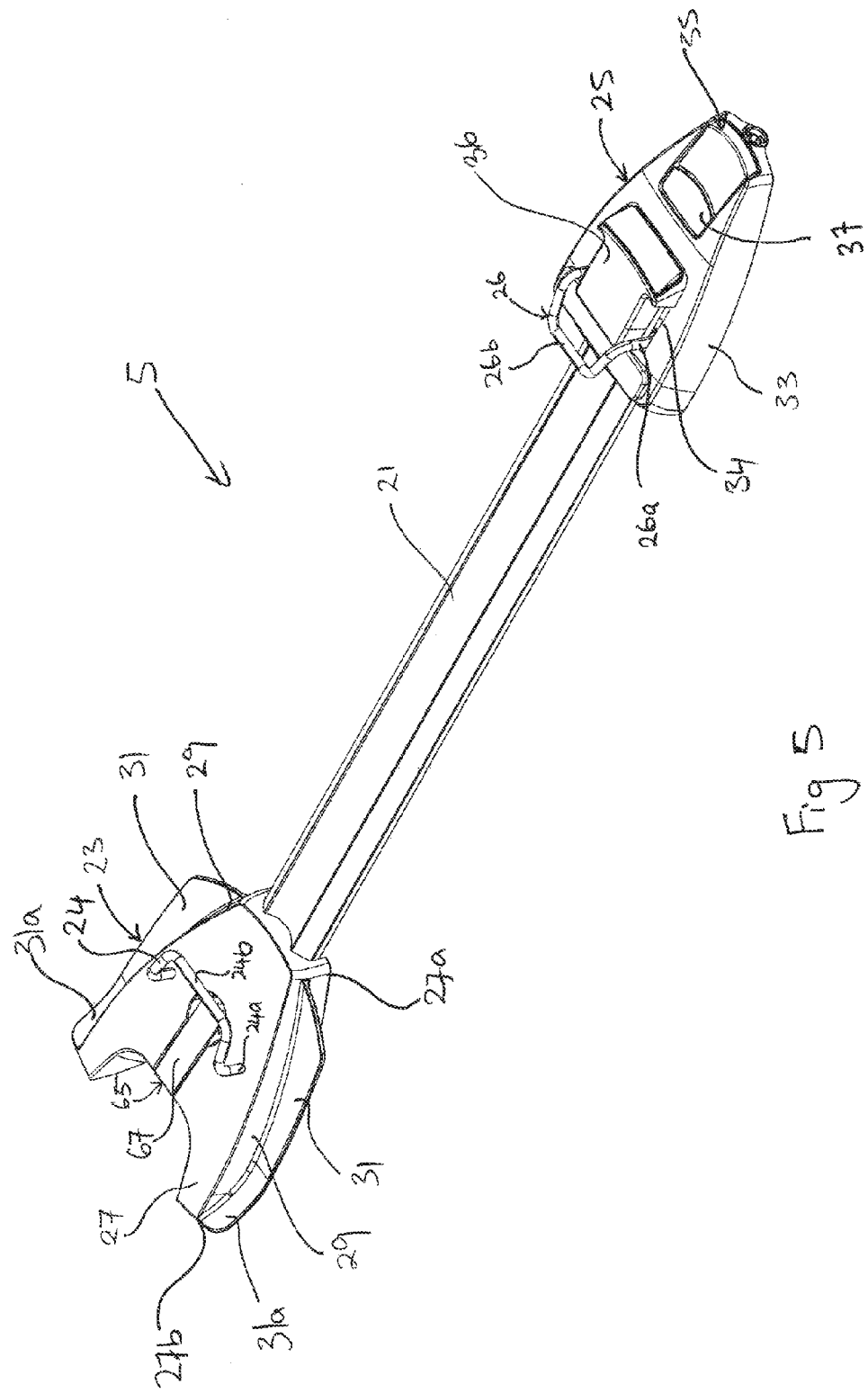

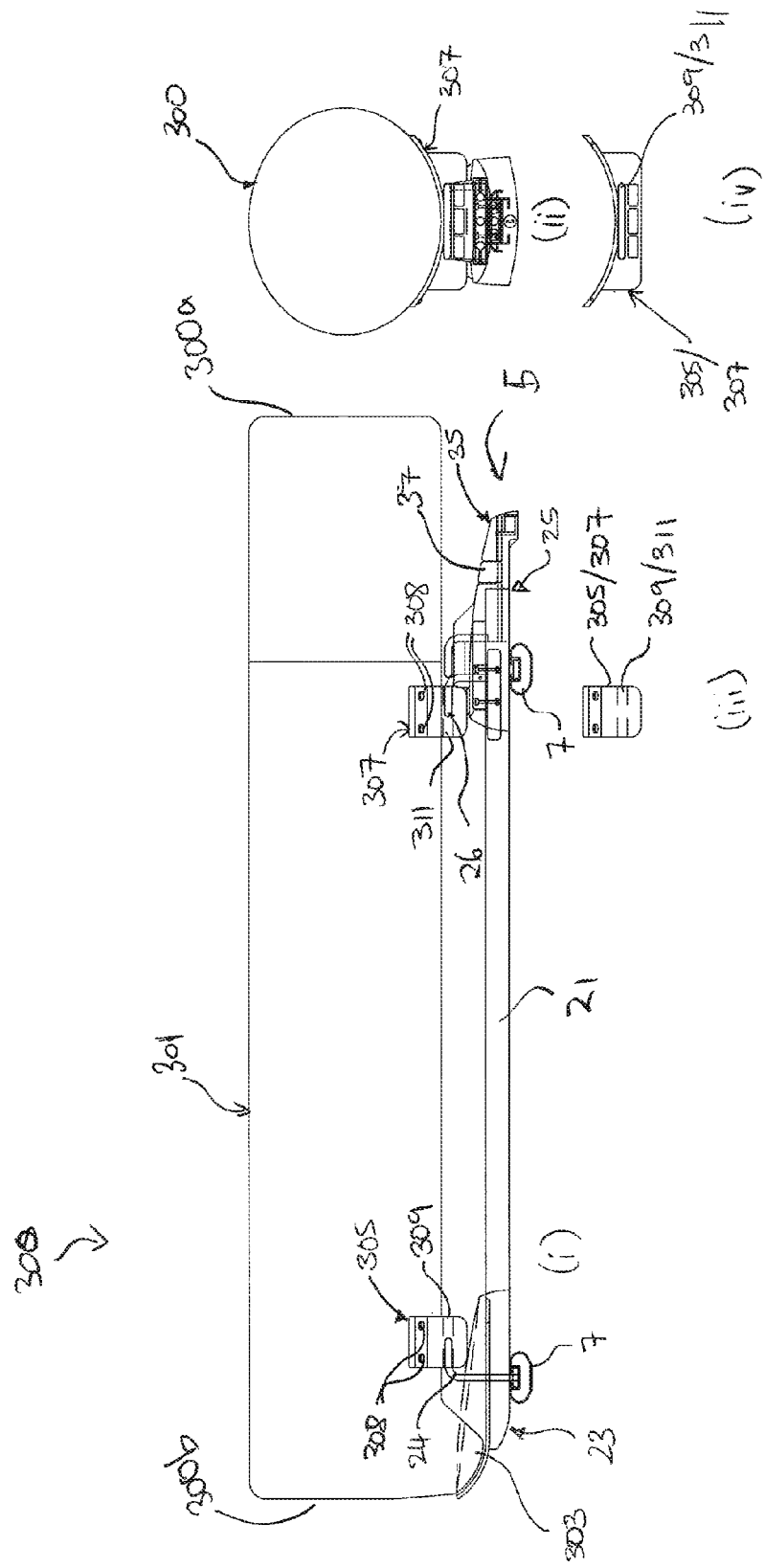

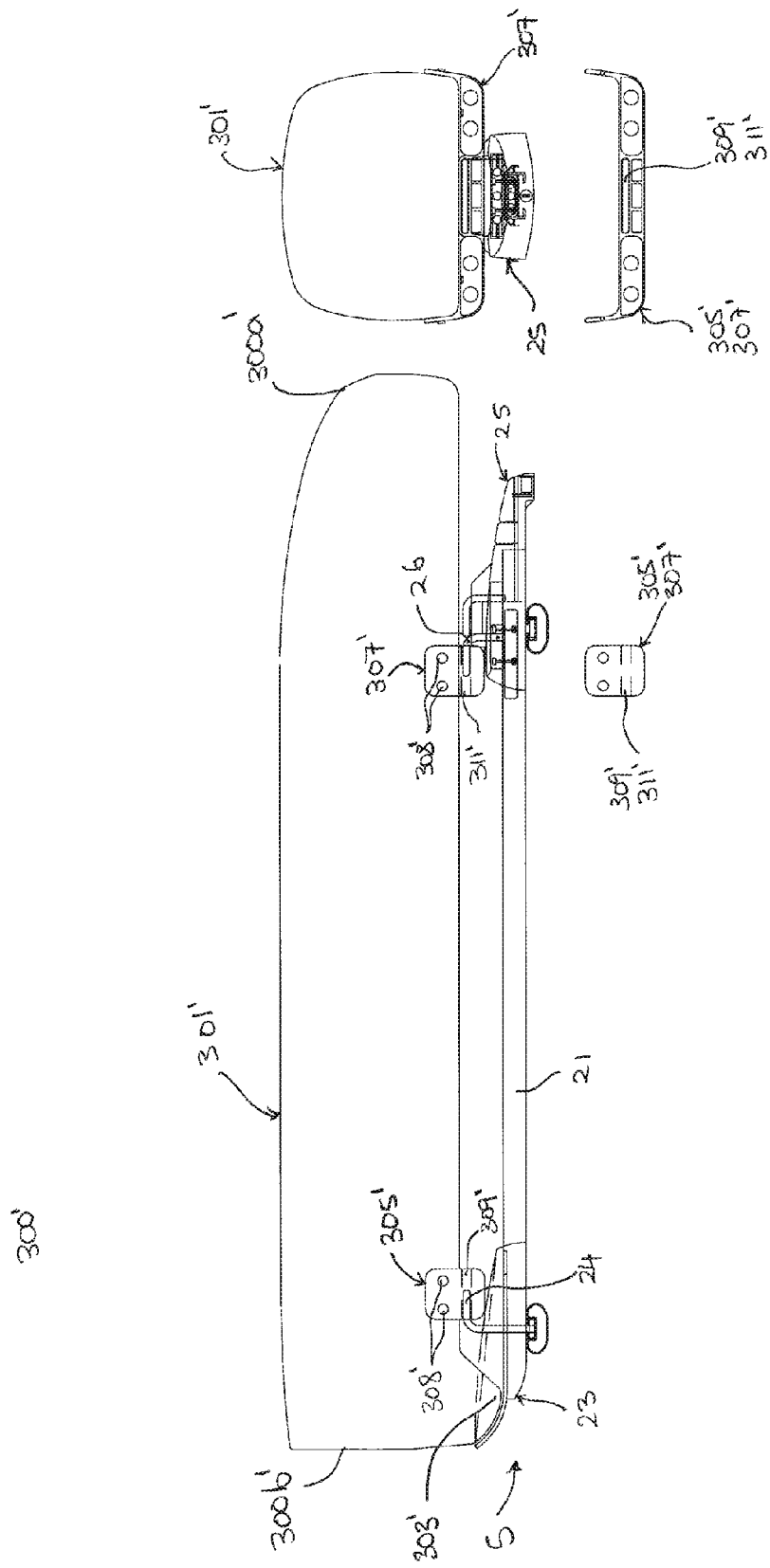

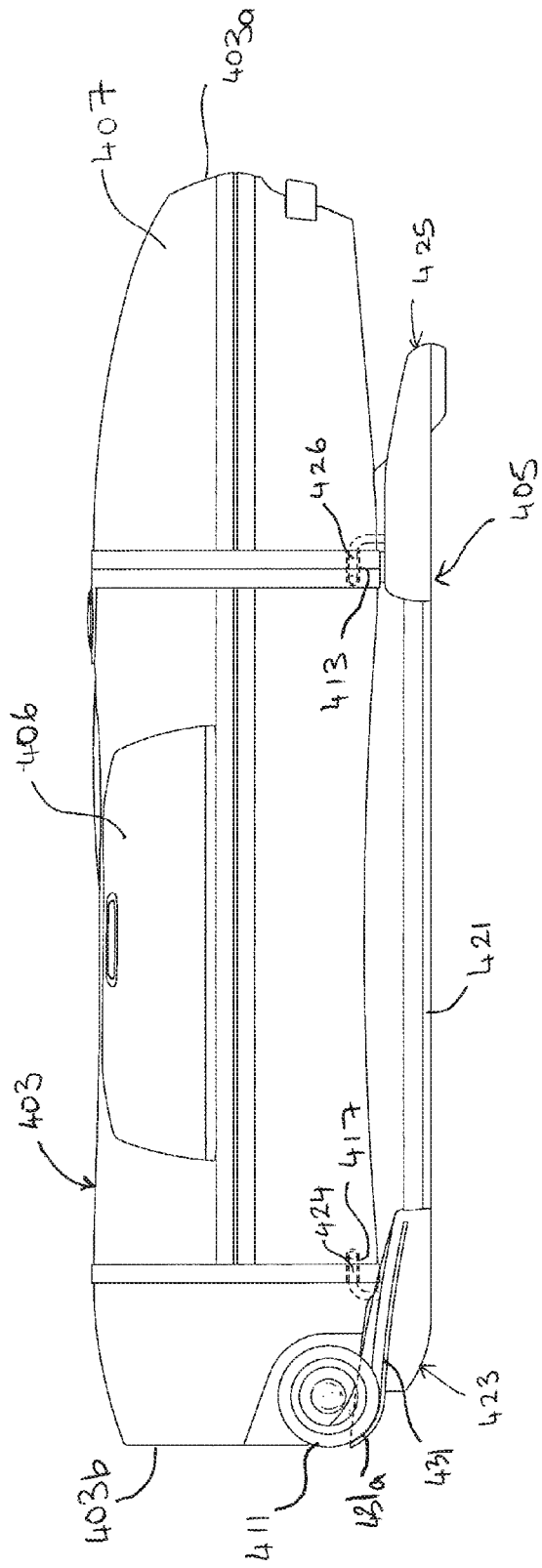

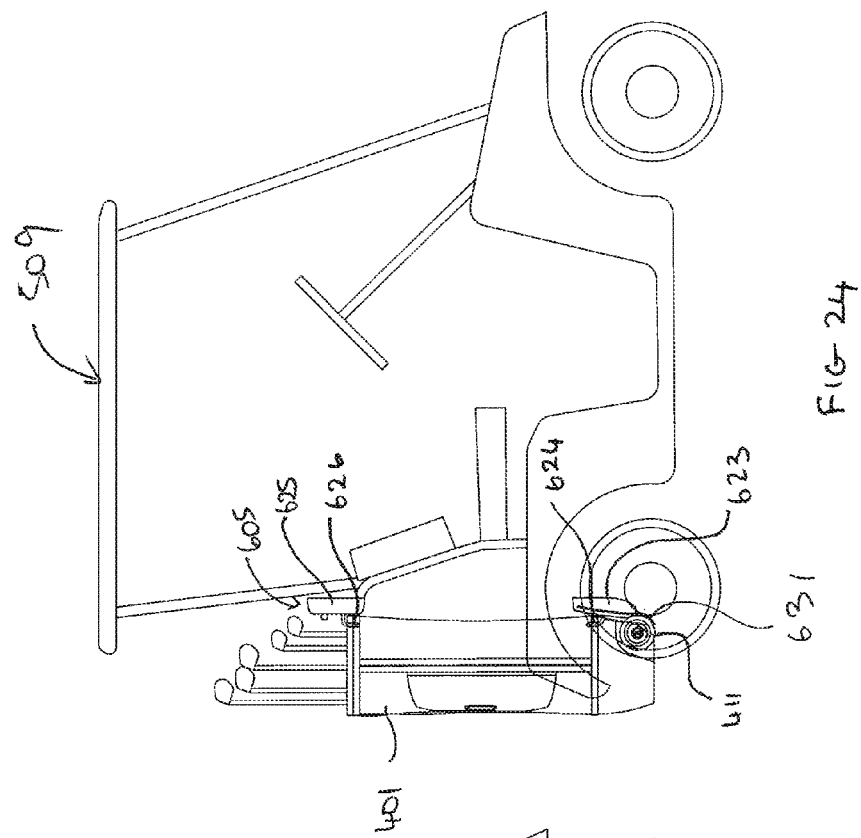
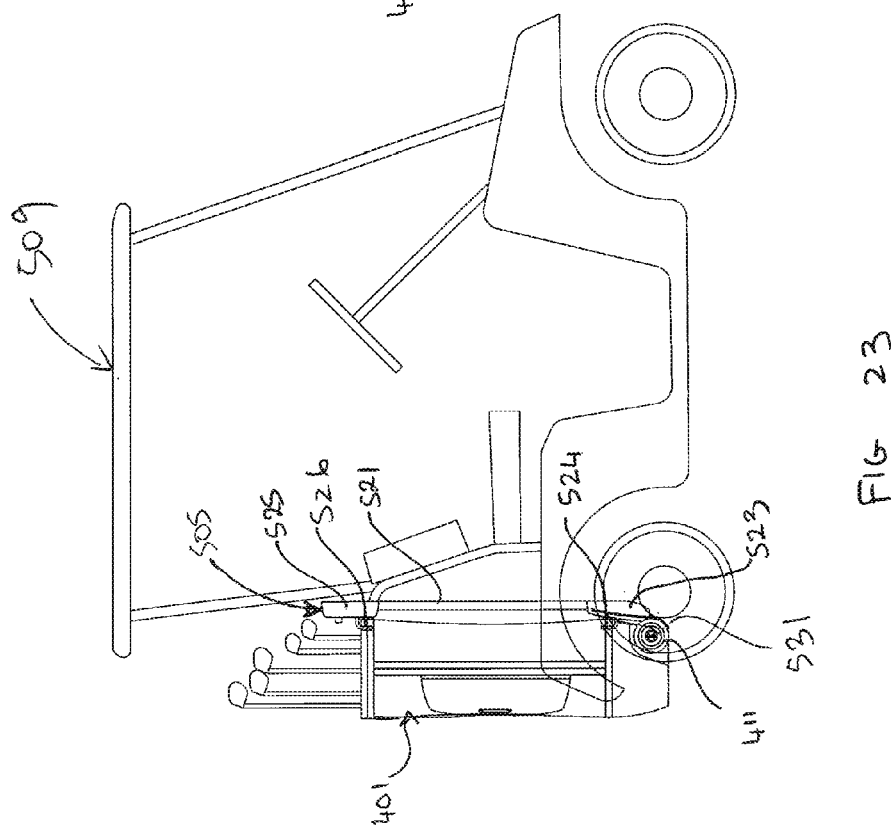

APPARATUS FOR MOUNTING AN ARTICLE TO A VEHICLE, AND AN ARTICLE FOR USE THEREWITH

FIELD OF THE INVENTION

This invention relates to an apparatus for mounting an article to a vehicle, and an article for mounting to the apparatus.

BACKGROUND

Often it is desirable to transport large items by automobile that cannot be comfortably or conveniently carried within the vehicle. Various vehicle mounted carrier racks and systems exist to transport such items on the exterior of a vehicle but these systems often have cumbersome or awkward attachment methods. For example, some racks require manually strapping the article to the rack or, in the case of roof-mounted systems, are awkward to load.

Many existing vehicle mounted carrier systems are generally useful for carrying sports equipment such as bicycles or kayaks but are not suitable for other items. Existing roof boxes are generally only suited to transporting luggage. The roof boxes are generally large and cumbersome and don't have other applications.

In this specification where reference has been made to patent specifications, other external documents, or other sources of information, this is generally for the purpose of providing a context for discussing the features of the invention. Unless specifically stated otherwise, reference to such external documents or such sources of information is not to be construed as an admission that such documents or such sources of information, in any jurisdiction, are prior art or form part of the common general knowledge in the art.

It is an object of at least preferred embodiments of the present invention to address one or more of the above mentioned disadvantages and/or to at least provide the public with a useful alternative.

SUMMARY OF THE INVENTION

A first aspect of the invention broadly comprises an apparatus for attaching an article to a vehicle. The apparatus comprises a main member attachable to a vehicle having a longitudinal axis, a first engagement member operatively connected to the main member at or towards a first end of the main member, and a second engagement member operatively connected to the main member at or towards a second end of the main member and that is slidable relative to the first engagement member in a longitudinal direction of the main member between an engaged position and a disengaged position. The apparatus has a transverse plane extending generally through the apparatus and coincident with the main member longitudinal axis. The first and second engagement members each comprise a retaining portion that is non-perpendicular relative to the transverse plane and that is configured to be received by respective engagement features on the article to substantially prevent movement of the article away from the main member.

In preferred embodiments, the first engagement member is fixed or fixable relative to the main member. The engagement members are preferably configured to engage respective first and second recesses on the article.

In an embodiment, the first and second engagement member retaining portions are substantially parallel to the transverse member and/or extend towards each other.

The engagement members may comprise oppositely orientated substantially L-shaped members. Alternatively, the engagement members may be otherwise shaped. For example, they may be curved members or may comprise T-shaped members. In a further alternative embodiment, the engagement members may comprise recesses configured to engage protrusions or hooks on the article.

In preferred embodiments, the apparatus comprises a first end part fixed to the main member at or towards the first end of the main member, with the first engagement member provided on the first end part. The first end part preferably comprises a guide for aligning the article relative to the first engagement member.

In preferred embodiments, the apparatus comprises a second end part that is fixed to the main member at or towards the second end of the main member, and a slidable assembly that is slidable relative to the second end part between an engagement position and a disengagement position, with the second engagement member provided on the slidable assembly. The second end part preferably comprises a cam surface and an adjuster that is movable between a first position abutting the cam surface to substantially prevent sliding of the slidable assembly relative to the second end part, and a second position wherein the slidable assembly is slidable relative to the cam surface.

In an embodiment, the adjuster is biased into its first position. The apparatus is preferably configured such that the adjuster is held in its second position when the slidable assembly is positioned intermediate its engagement position and its disengagement position.

The adjuster may comprise a button, wherein depressing the button moves the button to its second position.

In an embodiment, the cam surface is configured such that: with the slidable assembly in the engagement position and the adjuster in its first position, the adjuster abuts a first end portion of the cam surface; with the slidable assembly in the disengagement position and the adjuster in its first position, the adjuster abuts an opposite second end portion of the cam surface; and with the slidable assembly intermediate its engagement and disengagement positions and the adjuster in its second position, the adjuster abuts an intermediate third portion of the cam surface. The third portion of the cam surface is preferably substantially perpendicular to the first and second portions of the cam surface.

In an embodiment, the second end part houses at least a major portion of the slidable assembly.

The apparatus may comprise a lock that is lockable to lock movement of the slidable assembly relative to the main member when the slidable member is in its engagement position.

In an embodiment, the slidable assembly is biased towards its engagement position. For example, the slidable assembly may be biased by a compression spring provided between the slidable assembly and the second end part to bias the slidable assembly towards its engagement position.

In an embodiment, the slidable assembly comprises a visual warning feature that is visible when the slidable assembly is in its disengaged position, and that is obscured by the second end part when the slidable assembly is in its engagement position.

The apparatus may be configured for mounting to a vehicle mounted carry rack such as a roof rack or a hitch or tow-ball mounted carrier. Additionally or alternatively, the apparatus may be configured for mounting to a wall.

A second aspect of the invention broadly comprises an apparatus for attaching an article to a vehicle. The article comprises two spaced apart projections. The apparatus comprises a guide configured to receive the two projections, and a retention member. The apparatus is configured such that when the projections are positioned at or toward a first end of the guide, the article is pivotable sideways relative to the guide, and such that when the projections are positioned at or toward a second end of the guide, the article is aligned in a desired orientation and substantially prevented from pivoting sideways with the retention member substantially preventing movement of the article outwards from the guide member.

In a preferred embodiment, the retention member comprises an engagement member configured to engage a complementary recess on the article.

The guide is preferably configured such that when the projections are positioned at or toward a first end of the guide, the article is pivotable at least 20 degrees sideways relative to the desired orientation of the article. In an embodiment, the guide is configured such that the article can enter the guide at the first end of the guide when it is oriented up to at least 20 degrees sideways relative to the desired orientation of the article. In a preferred embodiment, the guide is configured such that the article can enter the guide at the first end of the guide when it is oriented up to about 23 degrees sideways relative to the desired orientation of the article.

The guide may comprise a central member defining two side walls, with a ledge projecting from each side wall, and the side walls may be shaped to guide and orient the article in the desired orientation as the projections article are moved along the ledges from the first end of the guide towards the second end of the guide. The side walls of the guide are preferably closer together towards the first end of the guide than towards the second end of the guide. The depth of the side walls is preferably less at the first end of the guide than at the second end of the guide.

In an embodiment, at least a major part of the ledges is substantially parallel to or coplanar with a transverse plane that extends generally through the apparatus. The ledges may be wider towards the first end of the guide than at or towards the second end of the guide.

In an embodiment, the apparatus comprise a stop at the second end of the guide, to limit movement of the protrusions along the guide. For example, the ledges may comprise a curved end portion towards the second end of the guide, the curved portions providing the stop.

The apparatus may further comprise a main member for attaching to a vehicle, the guide member being fixed to the main member at or towards a first end of the main member.

The apparatus may be configured for mounting to a vehicle mounted carry rack such as a roof rack or a hitch or tow-ball mounted carrier. Additionally or alternatively, the apparatus may be configured for mounting to a wall.

In an embodiment, the apparatus is configured for mounting to the roof of a vehicle in a longitudinal direction of the vehicle, such that the article can enter the guide when it is angled up to at least 20 degrees sideways from the longitudinal direction of the vehicle, to aid a user in placing an article on the guide from a side of the vehicle.

In an embodiment, the apparatus comprises a second retention member for attaching the article to the apparatus, the second retention member being operatively attached to the main member at or toward a second end of the main member. The second retention member may be slidable relative to the main member.

In an embodiment, there is provided an apparatus for attaching an article to a vehicle, the article comprising two spaced apart projections. The apparatus may comprise a main member attachable to a vehicle having a longitudinal axis, a guide provided at or towards the first end of the main member, configured to receive the two projections, a first engagement member operatively connected to the main member at or towards a first end of the main member, and a second engagement member operatively connected to the main member at or towards a second end of the main member and that is slidable relative to the first engagement member in a longitudinal direction of the main member between an engaged position and a disengaged position. The apparatus may have a transverse plane extending generally through the apparatus and coincident with the main member longitudinal axis. The first and second engagement members each comprise a retaining portion that is non-perpendicular relative to the transverse plane and that is configured to be received by respective engagement features on the article to substantially prevent movement of the article away from the main member. The apparatus is preferably configured such that when the projections are positioned at or toward a first end of the guide, the article is pivotable sideways relative to the guide, and such that when the projections are positioned at or toward a second end of the guide, the article is aligned in a desired orientation and substantially prevented from pivoting sideways with the first engagement member substantially preventing movement of the article outwards from the guide member.

The apparatus may have any combination of the features described above with respect to the first and second aspects.

A third aspect of the invention broadly comprises an article for mounting to the apparatus described above in relation to the first aspect. A first side of the article comprises a first attachment feature configured to receive at least a portion of the first engagement member, and a second attachment feature that is spaced from the first attachment feature in a longitudinal direction of the article and configured to receive at least a portion of the second engagement member.

In a preferred embodiment, the first and second attachment features each comprise a recess.

In an embodiment, the recesses are configured to receive opposed substantially L-shaped respective first and second engagement members.

The recesses may each comprise a lip to catch the retaining portions of the engagement members when the second engagement member is in its engagement position, such that the article cannot be removed from the apparatus when the second engagement member is in its engagement position.

In an embodiment, the article is a wheeled carrier. Additionally or alternatively, the article may comprise a golf carrier.

A fourth aspect of the invention broadly comprises an article for mounting to the apparatus described above in relation to the second aspect. The article comprises two guide projections that are spaced apart in a transverse direction of the article and configured to be received by the guide of the apparatus.

In a preferred embodiment, the article comprises engagement feature for receiving the retention member.

The guide projections may project partly beyond the body of the article. In one embodiment, the guide projections comprise wheels. The wheels may be positioned at or toward lower rear corners of the article.

In one embodiment, the article is a wheeled carrier. Additionally or alternatively, the article may comprise a golf carrier.

In an embodiment, there is provided an article for mounting to the apparatus described above in relation to the first and/or second aspects. A first side of the article comprises a first attachment feature configured to receive at least a portion of the first engagement member, and a second attachment feature that is spaced from the first attachment feature in a longitudinal direction of the article and configured to receive at least a portion of the second engagement member. The article further comprises two guide projections that are spaced apart in a transverse direction of the article and configured to be received by the guide of the apparatus.

The described article may have any combination of the features described above with respect to the third and fourth aspects.

A fifth aspect of the invention broadly comprises a system for mounting an article to the apparatus described above in relation to the first aspect. The system comprises a first attachment bracket having a first attachment feature configured to receive at least a portion of the first engagement member, and a second attachment bracket having a second attachment feature configured to receive at least a portion of the second engagement member, wherein the first and second brackets are configured to be fixed to the article.

In an embodiment, the article is a bag and the first bracket is adapted to receive a first portion of the bag, and the second bracket is adapted to receive a second portion of the bag.

The system may comprise different first and second brackets. One of the brackets may comprise two guide projections that are spaced apart in a transverse direction of the article and configured to be received by the guide of the apparatus described above in relation to the second aspect.

In an embodiment, the first and second brackets are integral or connected by a body member to fix the distance between the brackets.

The term 'comprising' as used in this specification and claims means 'consisting at least in part of'. When interpreting statements in this specification and claims which include the term 'comprising', other features besides the features prefaced by this term in each statement can also be present. Related terms such as 'comprise' and 'comprised' are to be interpreted in a similar manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

Where specific integers are mentioned herein which have known equivalents in the art to which this invention relates, such known equivalents are deemed to be incorporated herein as if individually set forth.

As used herein the term '(s)' following a noun means the plural and/or singular form of that noun.

As used herein the term 'and/or' means 'and' or 'or', or where the context allows both.

The invention consists in the foregoing and also envisages constructions of which the following gives examples only.

BRIEF DESCRIPTION OF THE DRAWINGS

The present invention will now be described by way of example only and with reference to the accompanying drawings in which:

FIG. 1 is a right side elevation view of a preferred form apparatus mounted to a vehicle roof rack, with a wheeled carrier attached to the apparatus, and showing the second engagement member in both its engaged and disengaged positions for comparison;

FIG. 4 is a perspective view of a preferred form wheeled carrier with the front of the carrier facing upwards, showing the rear engagement recesses and wheels;

FIG. 5 is a perspective view of the preferred form apparatus of FIG. 1;

FIGS. 7(i) to 7(iii) show the guide assembly of the apparatus of FIG. 5, FIG. 7(i) is an end view of the guide assembly, FIG. 7(ii) is a plan view, and FIG. 7(iii) is a right side elevation view;

FIGS. 8(i) to 8(iii) show the operation of the lock assembly on the guide assembly of FIGS. 7(i) to 7(iii), where FIG. 8(i) is a plan view of the guide assembly showing the lock lever lowered to clamp the apparatus to a roof rack bar, FIG. 8(ii) is a side view of the guide assembly showing the lock lever raised to unclamp the apparatus from the roof rack bar, and FIG. 8(iii) is a side view corresponding to FIG. 8(i);

FIGS. 14(i) to 14(iv) are a sequence of plan views showing the process for mounting a wheeled carrier to the apparatus of FIGS. 1 to 13, where FIG. 14(i) is a plan view of the apparatus in its disengaged mode for receiving the wheeled carrier, FIG. 14(ii) shows the wheels of the wheeled carrier entering the guide assembly, with the wheeled carrier at an angle of about 23 degrees to the apparatus, FIG. 14(ii) shows the wheeled carrier pushed part way along the guide assembly towards the second end of the guide and straightening up relative to the apparatus, and FIG. 14(iv) shows the wheeled carrier with its wheels at the second end of the guide aligning the carrier with the apparatus and showing the apparatus in its engagement mode with the first and second engagement members engaging the complementary recesses on the wheeled carrier;

FIGS. 16(i) to 16(iii) show a wheeled carrier attached to the apparatus of FIGS. 1 to 15(ii), showing the slidable assembly in its engagement configuration and the second engagement member in both its engaged and disengaged positions for comparison, where FIG. 16(i) is a plan view, FIG. 16(ii) is a right side elevation view, and FIG. 16(iii) is a front end view;

FIGS. 20(i) to 20(iv) show a bracket system for attaching a generic bag to the apparatus of FIGS. 1 to 16(iii), where FIG. 20(i) is a right side elevation view of the generic bag attached to the apparatus, FIG. 20(ii) is a front end view of the bag and apparatus arrangement of FIG. 20(i), FIG. 20(iii) is a right side elevation view of the attachment bracket, and FIG. 20(iv) is a front end view of the attachment bracket;

FIGS. 21(i) to 21(iv) correspond to the views of FIGS. 20(i) to 20(iv) but show an alternative bracket system for attaching an alternative generic bag to the apparatus FIGS. 1 to 16(iii);

FIG. 22 is a right side elevation view of the alternative embodiment carrier attached to an alternative embodiment apparatus;

FIG. 23 is a right side elevation view of the carrier of FIG. 22 mounted to a ride on golf cart;

FIG. 24 is a right side elevation view of the carrier of FIGS. 22 and 23 mounted to a ride on golf cart according to an alternative embodiment mounting;

FIGS. 27(i) and 27(ii) are left side elevation views of a golf push cart having a mounting apparatus for attaching the carrier of FIGS. 22 to 26, where FIG. 27(i) shows the mounting apparatus configured to hold the carrier in place, and FIG. 27(ii) is a partial view showing the upper part of the apparatus configured to receive or release the carrier;

FIGS. 29(i) and 29(ii) are left side elevation views of a golf push cart having an alternative mounting apparatus for attaching the carrier of FIGS. 22 to 26, where FIG. 29(i) shows the mounting apparatus configured to hold the carrier in place, and FIG. 29(ii) is a partial view showing the upper part of the apparatus configured to receive or release the carrier.

DETAILED DESCRIPTION OF A PREFERRED EMBODIMENT

Figure 3:
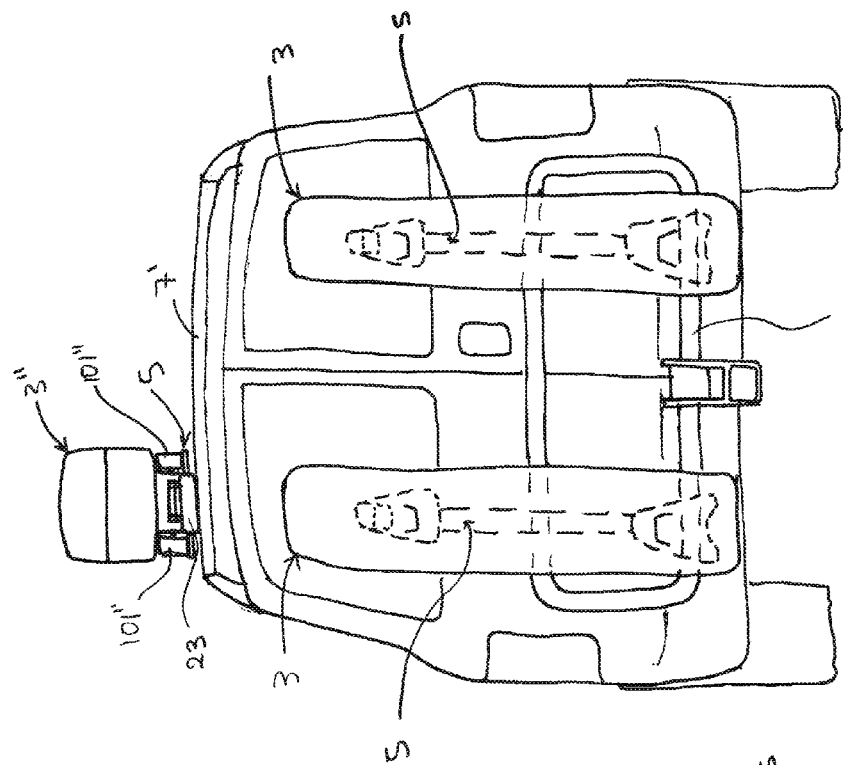
FIG. 3 is a rear elevation view of two preferred form apparatuses vertically mounted to a vehicle hitch mounted carrier, with a wheeled carrier attached to each apparatus, and showing a further alternative wheeled carrier attached to a roof mounted apparatus.

FIGS. 1 to 16(iii) illustrate an apparatus 5 for attaching an article 3 to a vehicle 9 in accordance with an embodiment of the present invention. For convenience, the apparatus 5 is described herein with reference to its orientation in the arrangement 1 shown in FIG. 1. However it will be apparent that other orientations of the apparatus 5 are possible and the description should not be construed as limiting the apparatus or its use. For example, the apparatus may be attached in an upright orientation to the rear of a vehicle such that the 'top' of the apparatus 5 as described and shown in FIG. 1 instead faces rearward.

The apparatus 5 comprises a main bar 21, a guide assembly 23 fixed to a first end of the main bar 21, and a securing assembly 25 attached to an opposite second end of the main bar 21. The securing assembly 25 comprises a slide housing 33 that is fixed to the main bar 21, and a slidable assembly 36 that is partly housed by the slide housing 33. The slidable assembly 36 is slidable forwards and rearwards relative to the slide housing 33.

Figure 2:
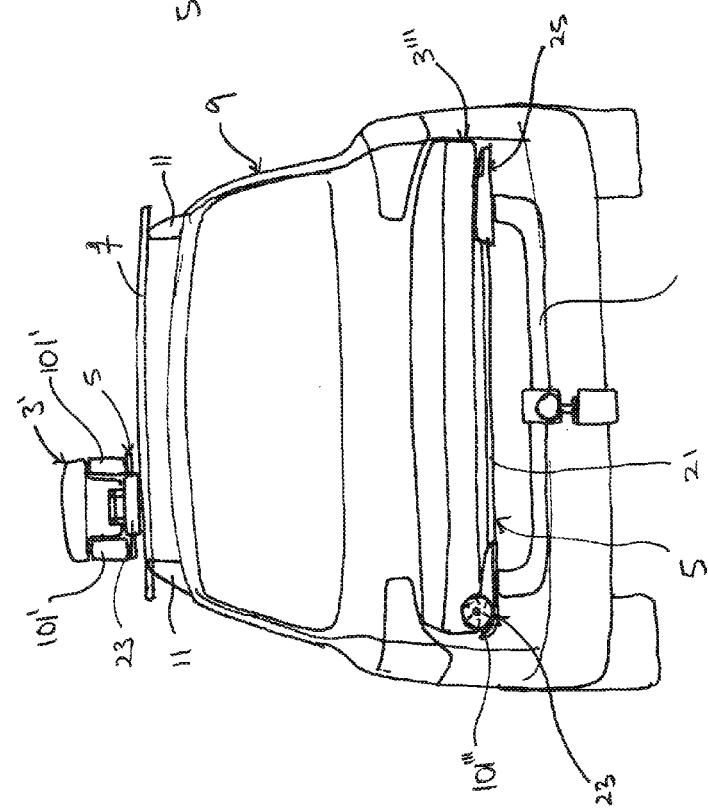
FIG. 2 is a rear elevation view of a preferred form apparatus horizontally mounted to a tow-ball mounted carrier, with an alternative wheeled carrier attached to the apparatus, also showing a further alternative wheeled carrier attached to a roof-rack mounted preferred form apparatus.

The apparatus 5 is configured to attach a wheeled carrier 3 or other article to a vehicle 9. FIG. 1 shows the apparatus 5 mounted on transverse roof rack bars 7 that are in turn mounted on longitudinal side roof rails 11 of a vehicle 9. The apparatus 5 is mounted in the longitudinal direction of the vehicle 9. The apparatus may alternatively be mounted to alternative vehicle mounted roof racks and other carry racks, for example to a rear mounted rack as shown in FIGS. 2 and 3.

An exemplary wheeled carrier 3 is shown in FIG. 4. The rear side of the wheeled carrier 3 comprises a first recess 107 towards the base 3b of the carrier, and a second recess 103 towards the top 3a of the carrier. The carrier 3 also comprises two spaced apart wheels 101 at or toward the bottom rear of the body of the carrier 3, which at least partly protrude rear of the carrier 3. Alternative articles for mounting to the apparatus 5 may comprise spaced apart protrusions rather than wheels 101.

The wheels 101 or protrusions may be adjustable to another configuration that is not suitable for mounting to the carrier. For example, the wheels or protrusions may be retractable for storage, or the wheels may be expandable or extendable to provide improved functionality in other uses of the carrier.

To grip the wheeled carrier 3 or another compatible article to attach the carrier 3 to the apparatus 5, a substantially L-shaped first engagement member in the form of a hook 24 is provided on the guide assembly 24 and is fixed relative to the main bar 21. A second, oppositely oriented L-shaped engagement member in the form of a hook 26 is provided on the slidable assembly 36. The second hook 26 is slidable with the slidable assembly 36, relative to the main bar 21 in the longitudinal direction of the bar 21, towards and away from the first hook 24.

The main bar 21 has a longitudinal axis AA. A transverse plane TP extends generally through the apparatus 5 and is coincident with the longitudinal axis as shown in FIG. 1.

The L-shaped engagement hooks 24, 26 each have a portion 24a, 26a that extends upwards, perpendicular to the main bar 21 and transverse plane TP, and a retention portion 24b, 26b extending towards the other hook 24, 26, substantially parallel to the transverse plane TP. In the embodiment shown, the hooks 24, 26 each comprise a bent rod with two substantially vertical legs 24a, 26a, and the hook retaining portions 24b, 26b comprise the portion of the rod 24b, 26b between the two legs, including two generally forward or rearwardly extending segments and an adjoining transverse segment.

The parallel retention portions 24b, 26b are received in the recesses 103, 107 to retain the article 3 and prevent it being moved away from the apparatus 5. For example, the retention portions 24b, 26b prevent the article 3 from being lifted off the apparatus 5 in the configuration of FIG. 1.

The first and second engagement hooks 24, 26 are configured to engage the complementary recesses 103, 107 on the carrier 3 to attach the carrier 3 to the apparatus 5, as shown in FIG. 1. To attach the article, the carrier 3 is moved such that the first engagement hook 24 engages the first recess 107 on the article. The second engagement hook 26 is then moved towards the first engagement hook 24, to engage the second recess 103 to attach the carrier 3 to the apparatus 5. The method for engaging first and second engagement hooks 24, 26, and for adjusting the slidable assembly 35 is explained in more detail below.

Figure 6:
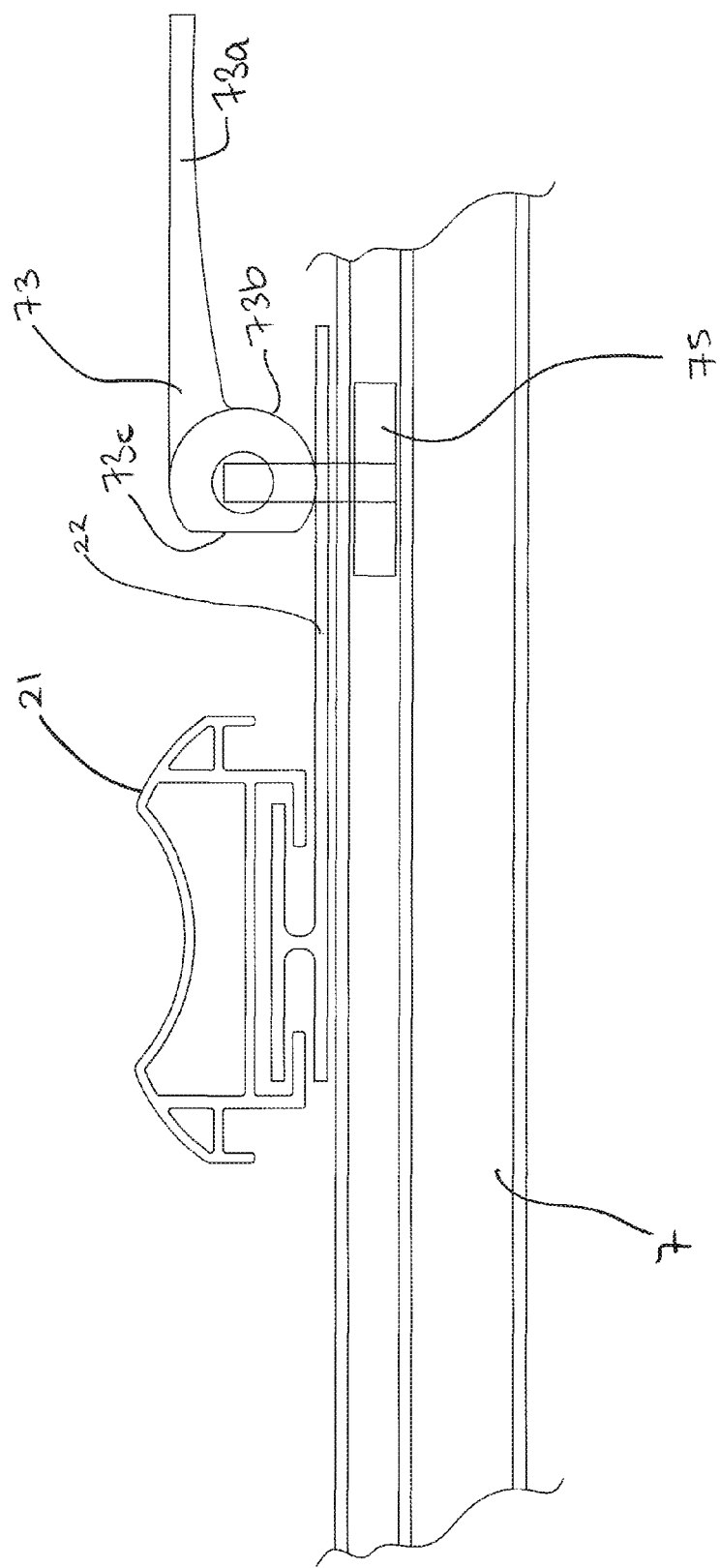
FIG. 6 is a partial cross-section view of a cam release mechanism clamping the main bar of the apparatus of FIGS. 1 to 5 to a cross bar of a roof rack.

The main bar 21 of the apparatus 5 is mountable to a vehicle roof rack 7 and/or to other vehicle mounted racks such as a tow-ball or hitch mounted carriers. In the embodiment shown, an underside of the main bar 21 has a slot with lips 21b for clamping or bolting the bar 21 to the roof rack bars 7 (FIG. 7(i)). The main bar 21 may be directly or indirectly attached to the roof rack bars. FIG. 6 shows an embodiment having an attachment member 22 attached to the main bar 21, and a quick-release cam mechanism 73 with an attached nut 75 positioned in the roof bar 7 channel. When the lever 73a is pivoted down, as shown in FIG. 6, the roof bar 7 is clamped tightly between the curved surface 73b of the cam and the nut 75. When the lever 73 is pivoted to vertical, the flat part of the cam surface 73c is parallel with the rail 7, loosening the connection between the attachment member 22 and the rail 7, allowing the nut 37 and thereby the main bar 21 to be slid along the channel in the rail 7.

The main bar 21 may have alternative cross-sectional profiles suitable for mounting to alternative racks. Alternatively or additionally, the apparatus may comprise a feature for mounting the apparatus 5 to a wall in a building or elsewhere, so is also usable for storing the article off a vehicle.

The ability of the apparatus 5 to be mounted to an existing vehicle roof rack 7 and/or rear mounted rack provides the advantage of a modular system. For example, one or more apparatuses 5 may be mounted the roof rack, or one apparatus may be mounted alongside skis and/or a bicycle or other item. The apparatus is easily removable from the roof rack 7 if a user wishes to transport an alternative item that is not compatible with the apparatus, for example some kayaks, without needing to remove the entire roof rack assembly.

Guide Assembly

Figure 7:
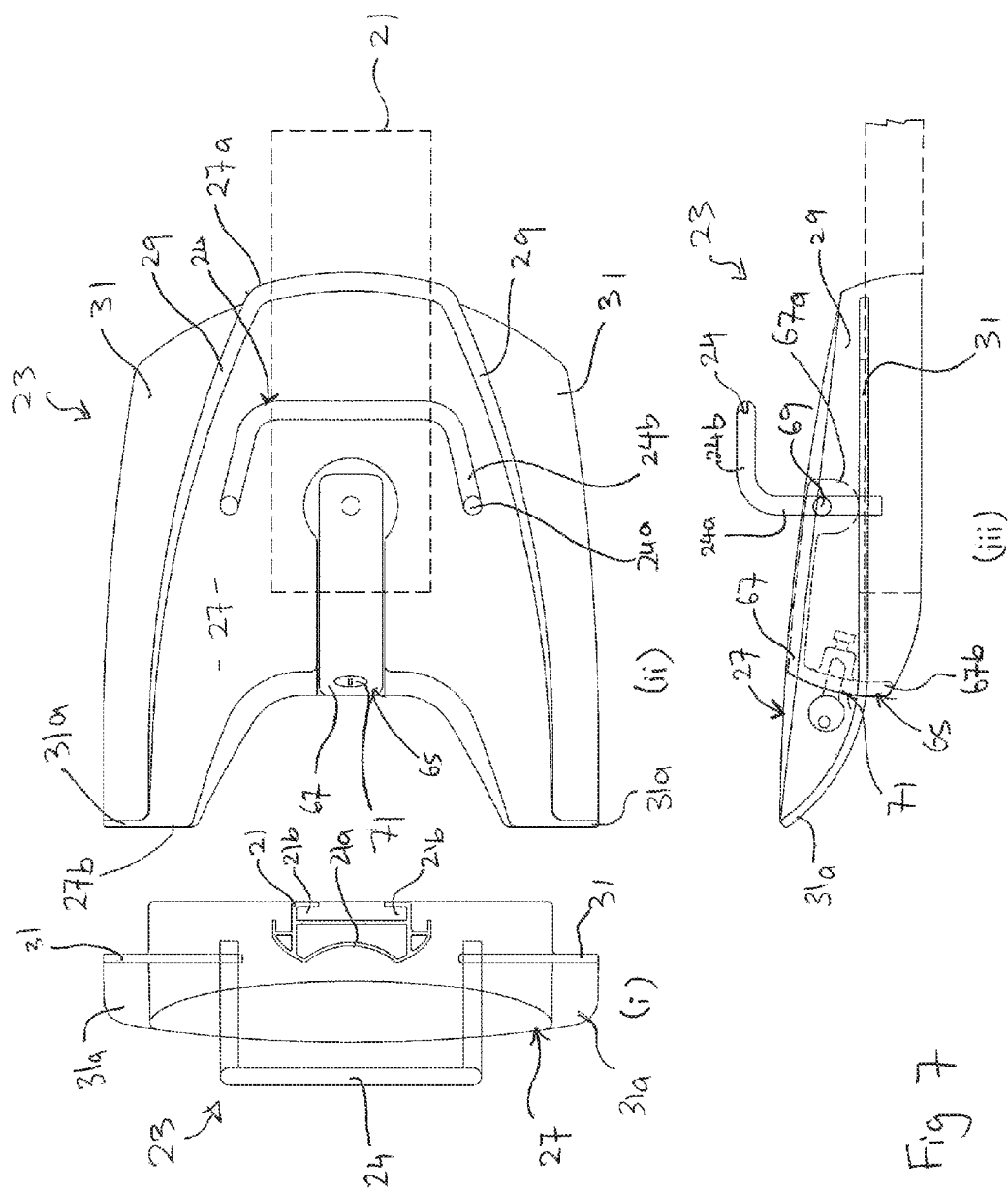

FIGS. 5, 7(i), and 7(ii) show the guide assembly 23. The guide assembly 23 guides and aligns the article 3 in a desired orientation as the article 3 is pushed onto the apparatus 5. In the desired orientation, the article recesses 103, 107 are aligned with the engagement members 24, 26.

The guide assembly 23 comprises a central member 27 that has two side walls 29. A ledge 31 projects from each side wall 29, from a position spaced below the top surface of the central member 27. At least a major portion of each ledge 31 is substantially parallel to the main bar 21, but the rear ends 31a of the ledges 31 curve upwards to provide a stop for the wheels 101 or guide projections. The curvature of the stop 31a is preferably substantially the same as the wheel 101 curvature.

The top surface of the central member 27 slopes upwards from its front 27a to its rear 27b, such that the height of the side walls 29 above the ledges 31 is higher towards the rear 27b of the central member than at the front end 27a of the central member. The front end 27a of the central member 27 is also narrower, with the side walls 29 closer together, than the rear end 27b of the central member. The side walls 29 of the central member 27 are substantially parallel at the rear 27b of the central member and gradually curve inwards towards the front of the guide member, where the wall curvature has a tangent of about 23 degrees. The curvature of the walls increases from the rear 27b of the guide member to the front 27a of the guide member. The ledges 31 are wider towards the front end 27a of the central member than at the rear 27b of the central member.

The horizontal portions of the ledges 31 provide a ledge for receiving and supporting the wheels 101 or guide projections on the article 3 as the article is placed on the apparatus 5. The side walls 29 above the ledges guide and orient the wheels 101 or projections on the ledges 31 to orientate the article as it is pushed onto the apparatus 5.

The narrower width of the central member 27, the lower side walls 29, and the wider ledges 31 at the front end of the guide assembly 23 enables the wheels 23 or protrusions to rest on the ledges 31 at a wide range of angles to the main bar 21 near the front of the guide assembly 23. In contrast, the width of the central member 27 towards the rear 27b of the central member 27 is substantially the same as the spacing between the wheels 101 on the carrier 3 and, in combination with the higher side walls, substantially restricts pivoting of the wheels 101 when they are positioned towards the rear of the guide assembly 23.

The gradual increase in the width and height of the central member 27 and the decrease in the curvature of the side walls 29 towards the rear end 27b of the central member means that the maximum angle β of the carrier 3 relative to the main bar 21 decreases as the wheels are pushed rearwardly along the ledges. In the embodiment shown, the maximum angle β is about 23 degrees when the wheels 101 are at the front end 27a of the ledges 31 and gradually decreases to substantially 0 degrees when the wheels 101 are at the rear end of the ledges contacting the stop 31a. This guide arrangement enables a carrier 3 to be placed on the guide assembly 23 from the side of the vehicle 9 at an angle to the apparatus 5, and to self-align relative to the apparatus as it is pushed rearwards to align the recesses 103, 107 with the engagement hooks 24, 26. This process, illustrated in FIGS. 14(i) to 15 and discussed in further detail below, makes mounting an article to the apparatus much easier than if the article needed to first be aligned with the apparatus.

Figure 8:
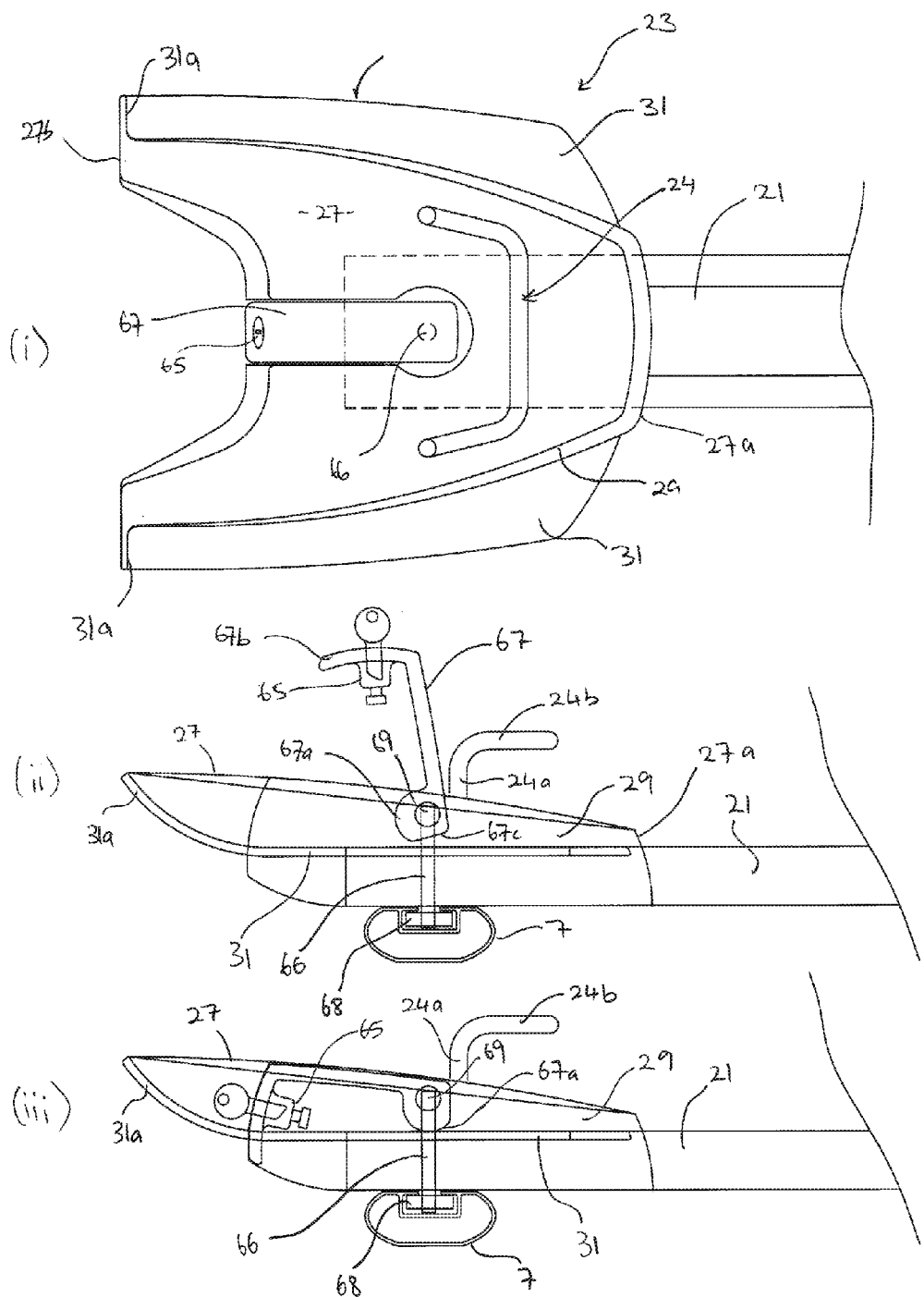

The guide assembly 23 comprises a lock assembly 65 for locking the apparatus 5 to the roof rack bar 7 or other rack. The lock assembly 65 comprises a quick-release cam lever 67 that is pivoted to a bolt 66 and attached nut 68 positioned in the roof bar 7 channel. When the lever 67 is pivoted down, as shown in FIGS. 8(i) and 8(iii), the roof bar 7 is clamped tightly between a curved surface 67a of the cam and the nut 68. When the lever 67 is pivoted upwards, a flat part of the cam surface 67c is parallel with the top of the rail 7, loosening the connection between the apparatus 5 and the rail 7 so the apparatus 5 may be slid along the channel in the rail 7. An end 67b of the lever 67 is lockable with a key in the clamping position of FIGS. 8(*i*) and 8(*iii*), to prevent removal of the apparatus 5 from the roof rack 7.

Latch Assembly

FIGS. 9 to 13 show the securing assembly 25 in various modes of operation. As shown in those figures, the slidable assembly 36 comprises a slide plate 45, a slide block 49 fixed to the plate 45, and a hook mounting block 47 that is bolted 52 or otherwise connected to the slide block 49 and supports the second engagement hook 26. The L-shaped engagement hook 26 protrudes above the slide housing 33 and the two substantially vertical legs 26a each pass through a respective slot 34 in the housing 33.

Figure 9:
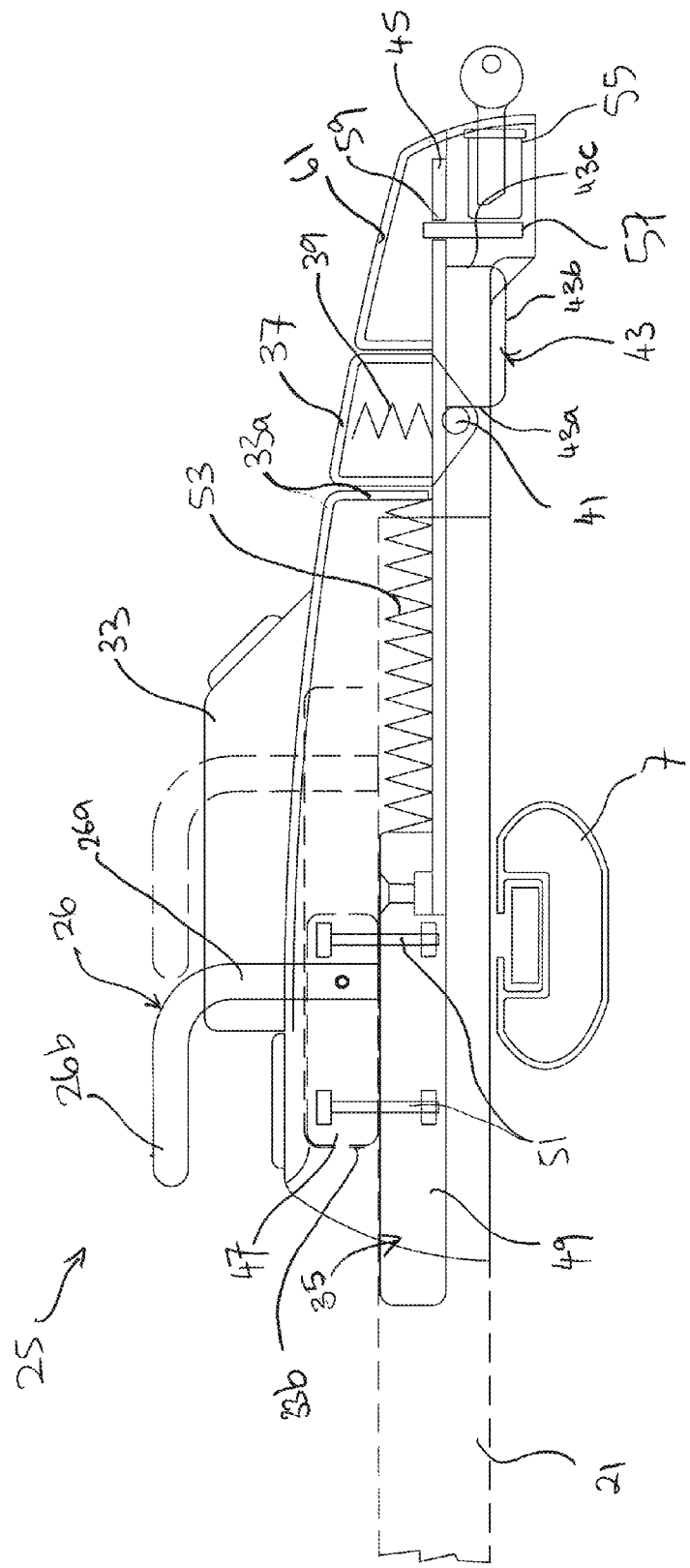
FIG. 9 is a right side schematic view of the securing assembly of the apparatus of FIG. 5 in the engagement mode, showing the engagement member in its engagement position in solid lines and in its disengaged position in phantom lines.

The slidable assembly 36 is biased into the rearward, engagement position shown in FIG. 9 by two compression springs 53 that act between a portion 33a of the housing 33 and an end of the slide block 49. Rearward movement of the slidable assembly 36 is limited by the top block 47 abutting an inner surface 33b of the housing and/or by the legs 26a of the engagement hook 26 abutting the respective rear ends of the slots 34.

Figure 11:
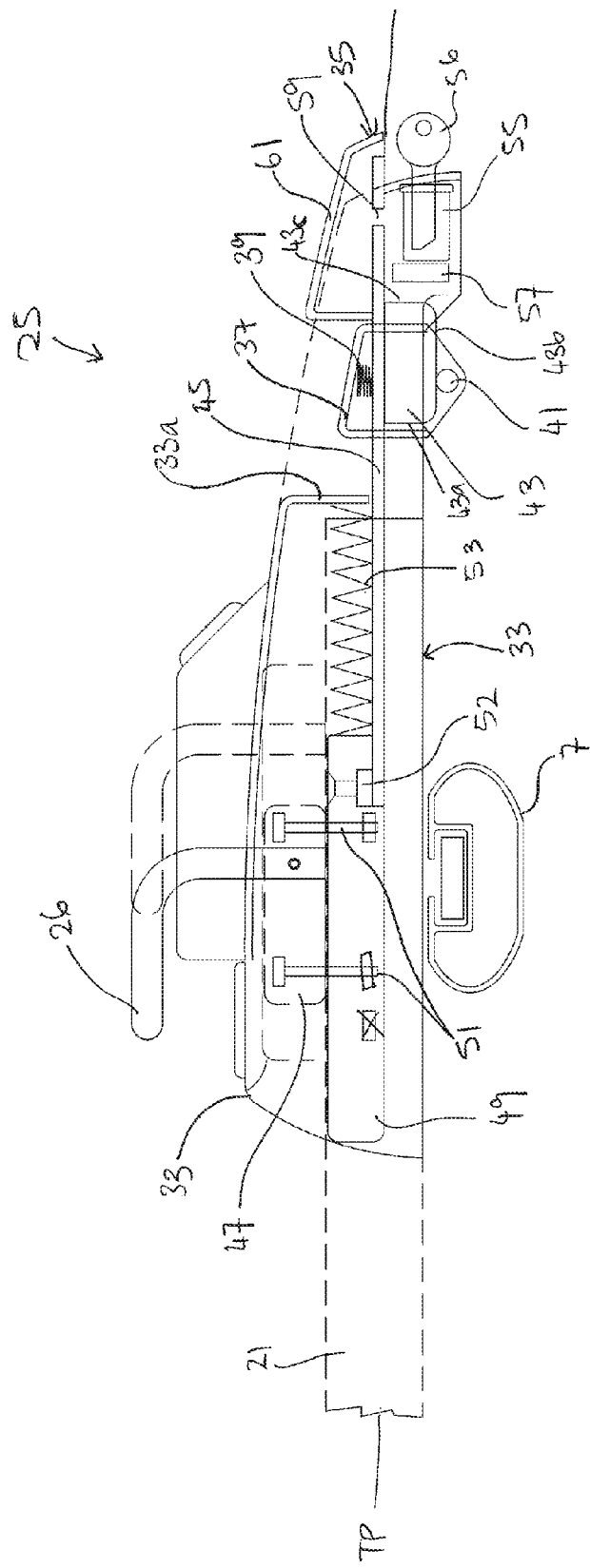
FIG. 11 is a right side schematic view of the securing assembly of FIGS. 9 to 10(ii) in an adjustment mode, showing the engagement member in solid lines in a position intermediate its engagement and disengaged positions and in phantom lines in its disengaged position.

The slide assembly 25 comprises an adjuster button 37 that is moveable up and down between an upper position shown in FIG. 9 and a depressed position shown in FIG. 11. A lower part of the button 37 comprises one or more protrusions or roll pins 41. The slide housing 33 comprises one or more cam surfaces 43 formed by a channel or slot provided in the walls of the slide housing 33, or by a stop attached to or integral with the housing 33 and the protrusion(s) or roll pin(s). In a preferred embodiment, the housing comprises two opposite side walls having the cam surfaces 43 provided by a blind slot 43 in each wall. The button comprises two outwardly directed, co axial side protrusions 41, with each protrusion being received by a respective one of the slots 43.

Figure 10:
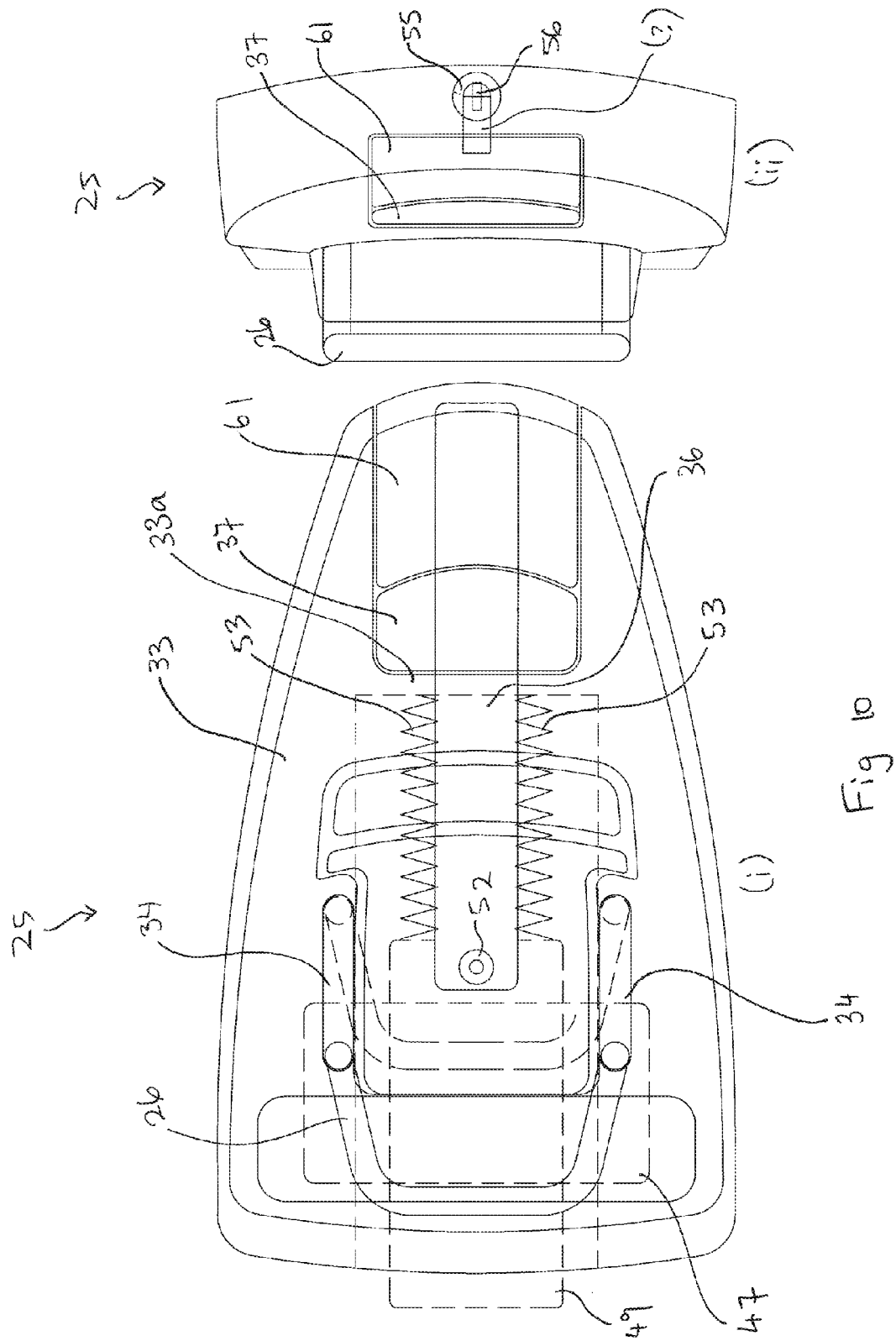
FIG. 10(i) is a schematic plan view of the securing assembly and configuration of FIG. 9, and FIG. 10(ii) is an end elevation view corresponding to FIG. 10(i)

FIGS. 9, 10(*i*), and 10(*ii*) show the securing assembly 25 in an engagement mode, the slidable assembly 26 and the hook 26 (solid lines) are in a rearmost position for engaging the corresponding top recess 103 on the carrier 3. In this configuration, the button 37 is biased upwards by a compression spring 39 such that the top of the button 37 is substantially flush with the upper surface of the housing 33. In this position, the protrusions or pins 41 abut a first vertical end portion of the cam surface 43, which prevents the slide assembly 35 being slid forward relative to the housing 33.

The securing assembly 25 further comprises a lock 55 for locking the slide assembly 35 in the engagement position of FIGS. 9 to 10(*ii*). The slide plate 45 comprises a lock aperture or slot 59. When the slide assembly 35 is slid rearward to its engagement position, the aperture or slot 59 is aligned with a lock pin 57. The lock 55 is lockable with a key 56 to engage the lock pin 57 in the aperture or slot 59, as a shown in FIG. 9. This prevents the securing assembly 25 being adjusted to the disengaged position and the article 3 being removed from the apparatus 5, without first unlocking the lock 55.

With the slidable assembly 35 in its engagement configuration, the button 37 is depressible to move the projections or pins 41 below the cam surface 43. If the lock 55 is unlocked, this enables the slide assembly to be slid forward relative to the housing 33 to an intermediate position shown in FIG. 11.

Figure 12:
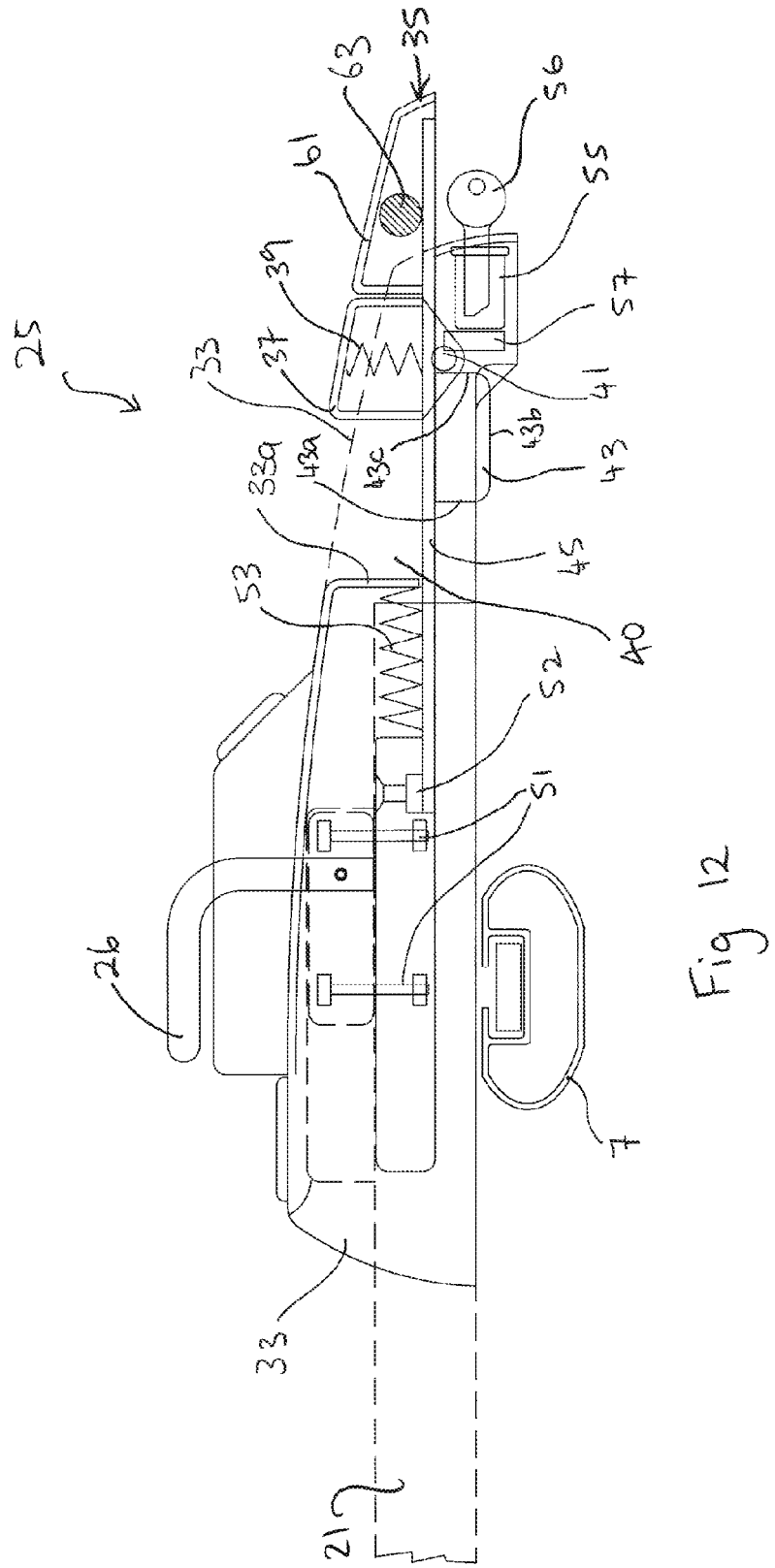
FIG. 12 is a right side schematic view of the securing assembly of FIGS. 9 to 11 in a disengaged mode.
Figure 13:
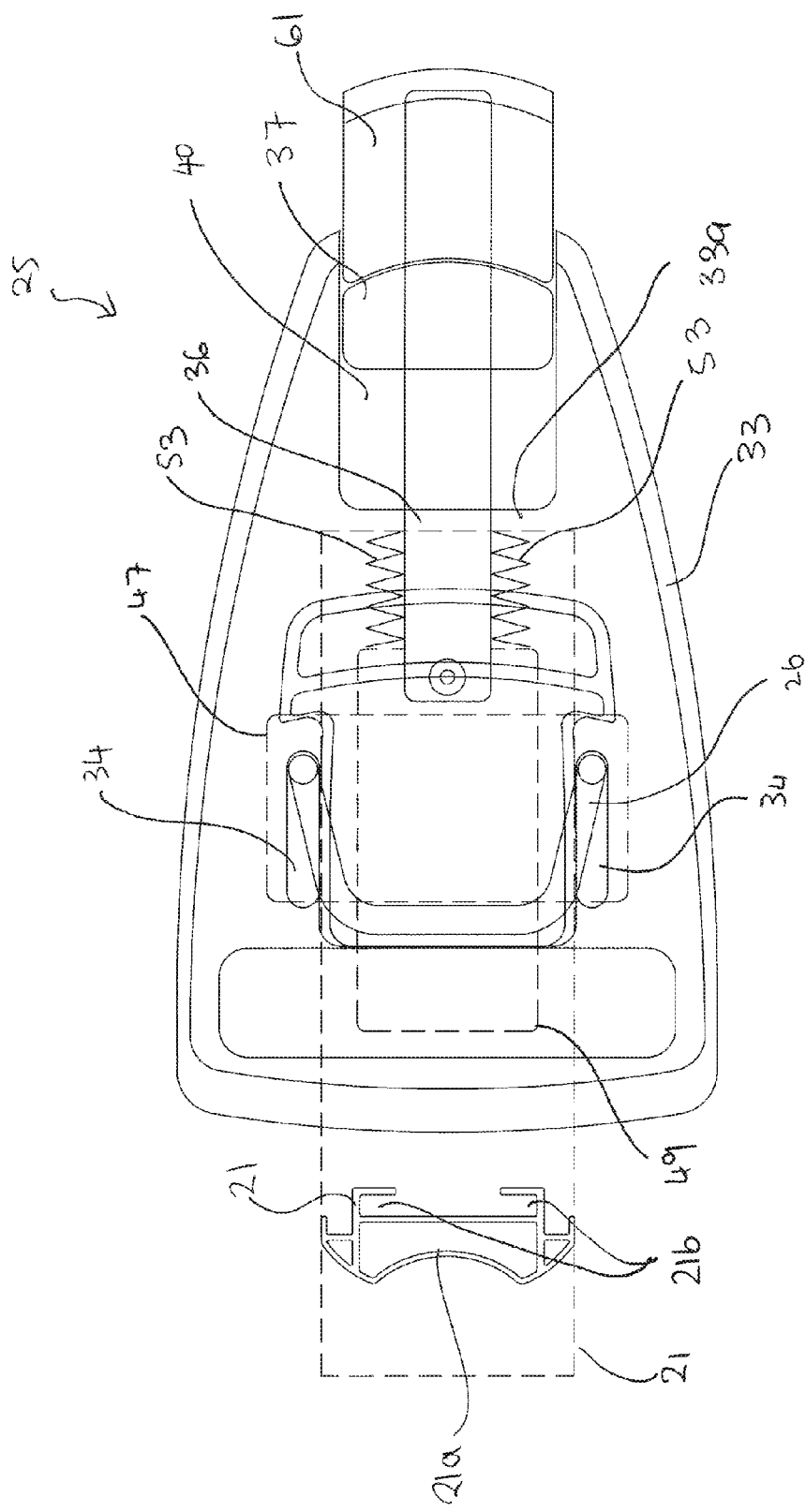
FIG. 13 is a schematic plan view of the securing assembly and configuration of FIG. 12, additionally showing the cross-section profile of the main member.

FIG. 11 shows the securing assembly 25 being adjusted from the engagement mode of FIGS. 9 to 10(*ii*) to a disengaged mode shown in FIGS. 12 and 13. In this intermediate mode, the button protrusions or pins 41 abut a horizontal portion 43b of their respective cam surface 43 to prevent the button 37 returning to its upper position. In this configuration, the slidable assembly 35 is slidable relative to the housing 33. If the slide assembly 35 is released in this configuration with the roll pins 41 abutting the horizontal portion 43b of the respective cam surface 43, the compression springs 53 acting on the slide block 49 will return the slide assembly 35 to the engagement configuration of FIGS. 9 to 10(*ii*), and the compression spring 39 on the button 37 will return the button 37 to its upper position to hold the slide assembly 35 in that engaged position.

The end portion 61 of the slidable assembly 35 provides a handle for a user to grasp and pull when the button 37 is depressed. A user may pull the slide assembly 35 forward to disengage the engagement member 26 from the corresponding recess 103 on the carrier 3. If the slide assembly 35 is pulled forward sufficiently, pulling the button protrusions or pins 41 forward of the horizontal cam surface 43b, the compression spring 39 on the button 37 will return the button 37 to its upper position, to hold the securing assembly 25 in the disengaged mode shown in FIGS. 12 and 13.

FIGS. 12 and 13 show the securing assembly 25 in a disengaged mode. In this mode, the button 37 is biased by a compression spring 39 into its upper position but the button 37 is no longer flush with the housing. The button protrusions or pins 41 abut a second vertical end portion 43c of the cam surface 43, opposite the first end portion 43a. When the button 37 is in its upper position, the second end portion 43c prevents the slide assembly 35 moving rearward relative to the housing 33 back into the engagement configuration.

In the disengaged mode of FIGS. 12 and 13, a gap 40 is created between portion 33a of the housing 33 and the button 37, and an end portion 61 of the slide assembly 35 protrudes beyond the housing 33. The end portion 61 preferably comprises a visual feature 63 such as a brightly coloured warning marker to alert a user that the apparatus is disengaged. The coloured marker 63 is obscured by the housing 33 when the slidable assembly 35 is in the engagement configuration.

In the disengaged mode of FIGS. 12 and 13, the button 37 is depressible. When the button 37 is fully depressed, the button projections or pins 41 move below the cam surfaces 43 enabling the slide assembly 35 to be slid rearward relative to the housing 33 back into the intermediate configuration shown in FIG. 11 and towards the engagement configuration of FIG. 9.

In FIGS. 9 to 11, the engagement member 26 is also shown in phantom lines in its forward-most, disengaged position shown in FIG. 12 for comparison.

Operation

Figure 14:
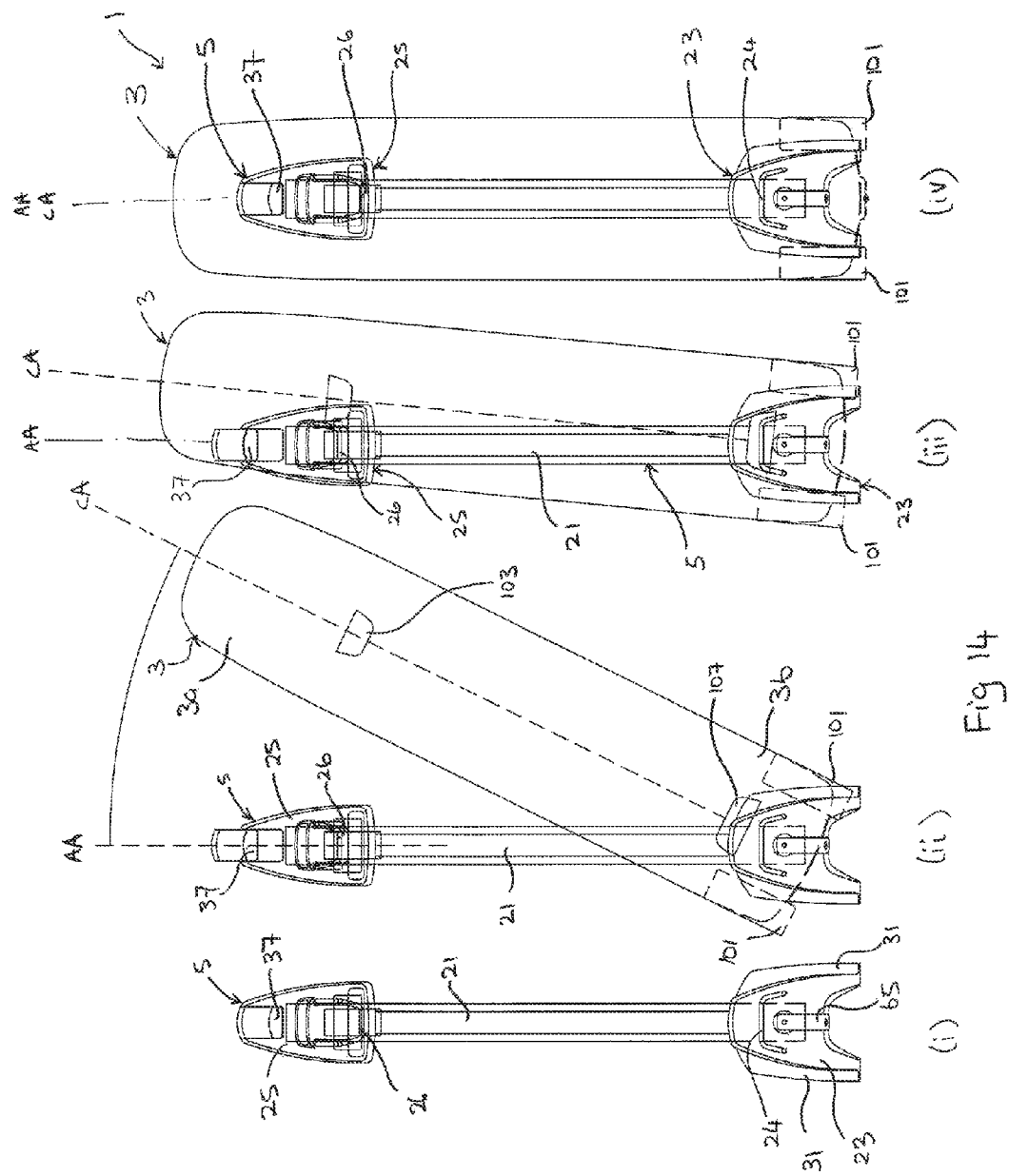
Figure 15:
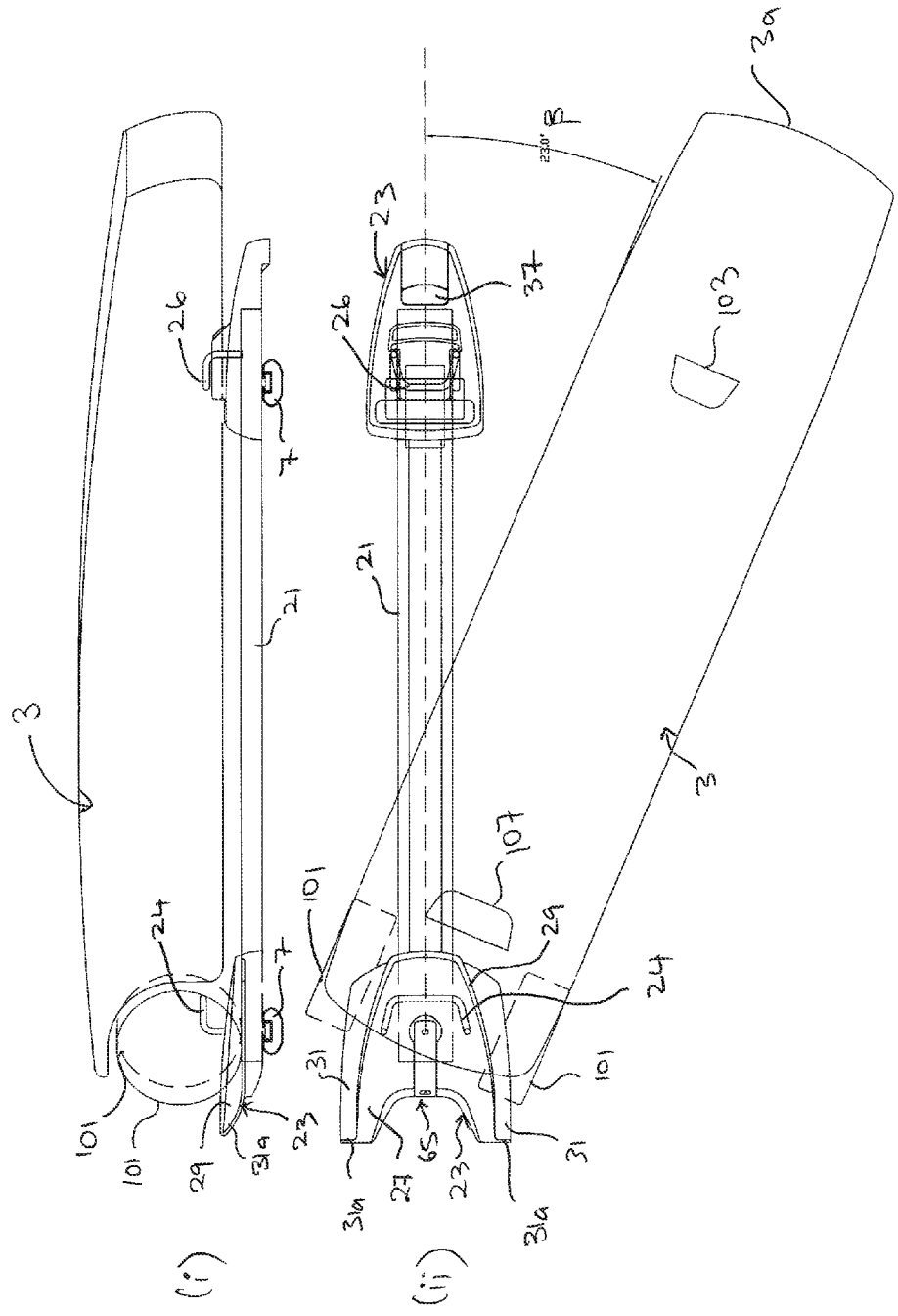
FIG. 15(i) is a side view of the configuration shown in FIG. 14(ii) for an alternative form carrier, and FIG. 15(ii) is the plan view of FIG. 14(ii) for an alternative form carrier, showing the angle between the apparatus and the carrier.

FIGS. 14(*i*) to (*iv*) illustrate the process for securing a carrier 3 or other article onto the apparatus 5. In a first step shown in FIG. 14(*i*), the apparatus 5 is adjusted so the securing assembly 25 is in the disengaged mode shown in FIGS. 12 and 13.

The carrier 3 is then placed base first onto the apparatus 5, by placing the wheels 101 on the ledges 31 of the guide assembly 23. It is not necessary to align the carrier axis CA 3 with the apparatus axis AA 5. FIG. 14(*ii*) shows the carrier 3 being placed onto the guide assembly 23 from a side of the apparatus 5, with the longitudinal axis CA of the carrier at an angle β of about 23 degrees to the apparatus longitudinal axis. In this step, further illustrated in FIGS. 15(*i*) and (*ii*), the carrier's outside wheel 101 is positioned on one of the ledges 31 towards the front of the guide assembly 23. The inside wheel 101 is supported on the other ledge 31 and abuts the respective side wall 29. A portion of the inside wheel overlaps the central member 27.

The carrier 3 may then pushed onto the guide assembly by the user applying a push force longitudinally along the carrier axis. This force is reacted by the respective guide wall 29 and, as shown in FIG. 14(*iii*), causes the carrier 3 to pivot about the contact point between the side wall 29 and the inside wheel 101. As the carrier 3 is pushed and pivots, the contact point between the side wall 29 and the inside wheel 101 also moves rearwards and the angle β between the carrier axis CA and the apparatus axis AA decreases.

When the carrier wheels 101 reach the ends 31*b* of the ledges 31, the first engagement hook 24 is engaged in the corresponding recess 107 on the carrier 3, and the carrier axis CA is aligned with the apparatus axis AA.

Figure 16:
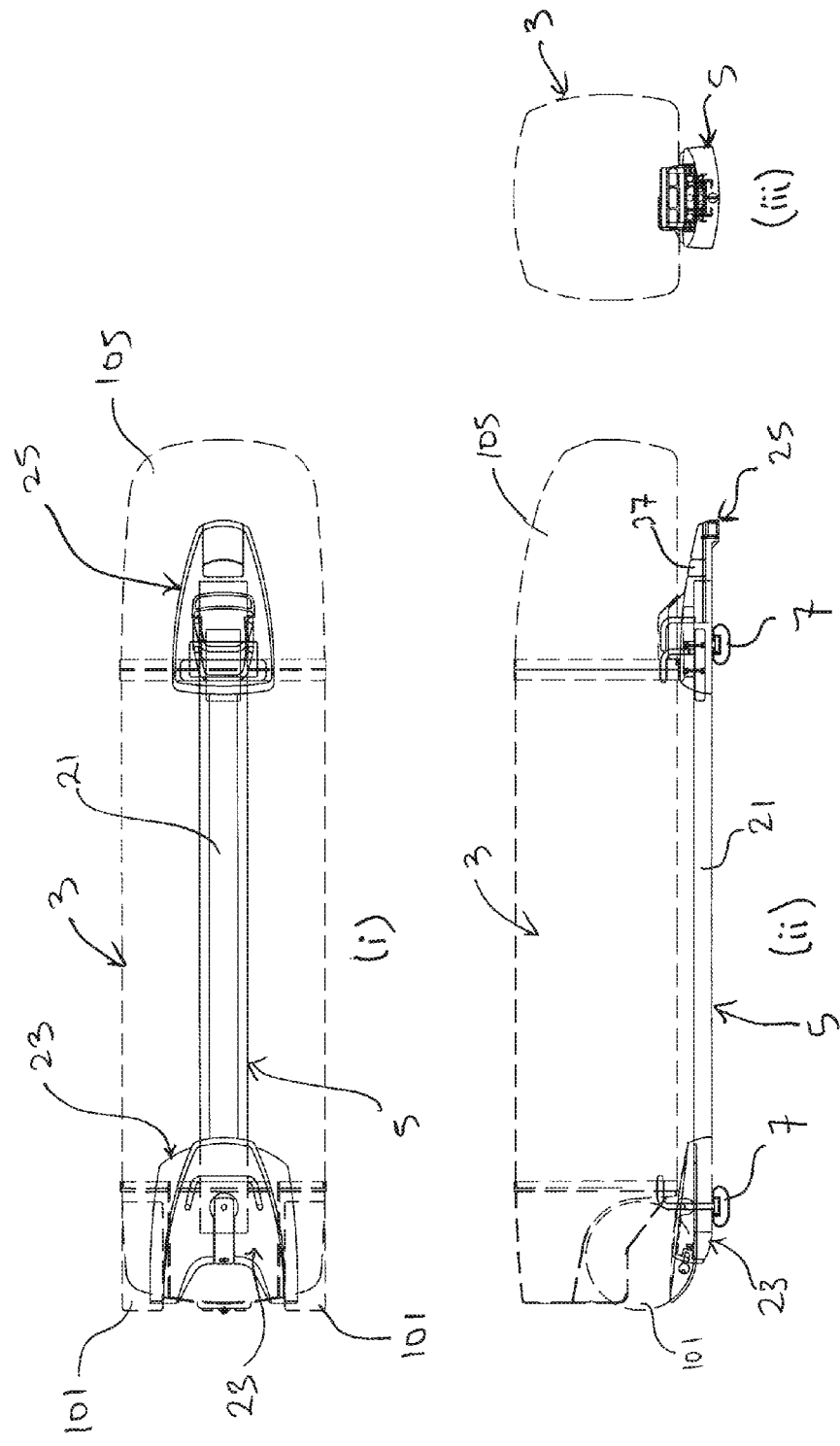
Figure 17:
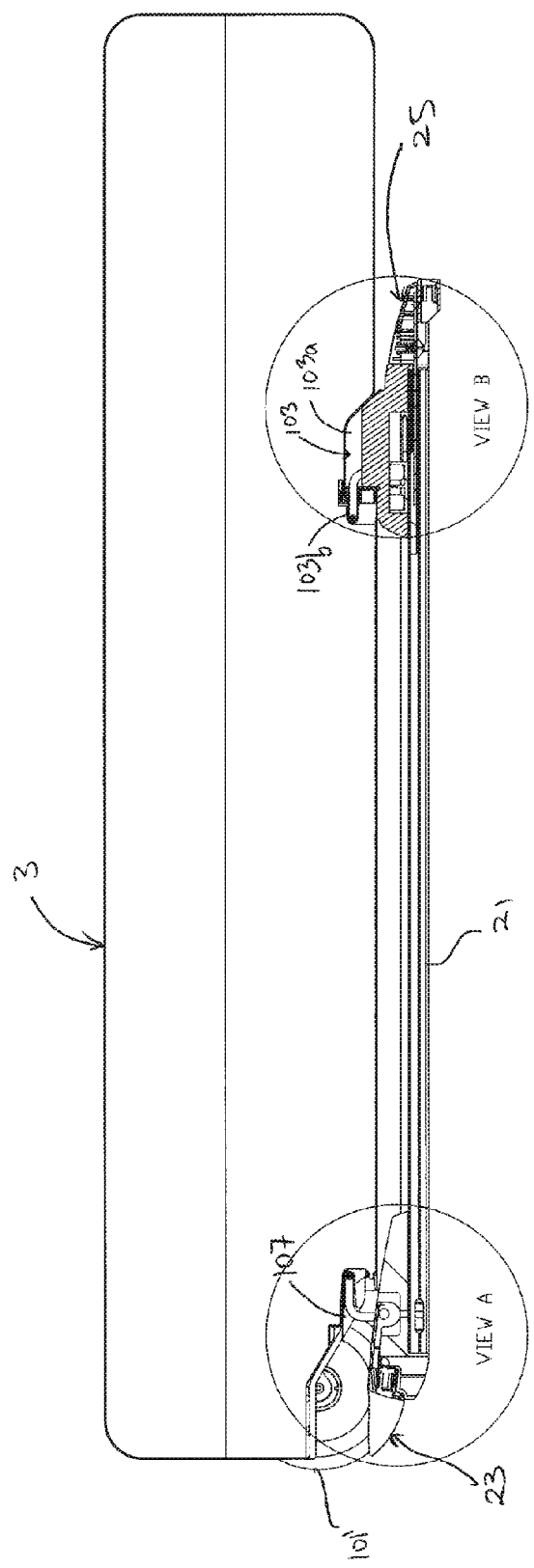
FIG. 17 is a section view of the apparatus of FIGS. 1 to 16(iii) attached to an alternative form wheeled carrier.
Figure 19:
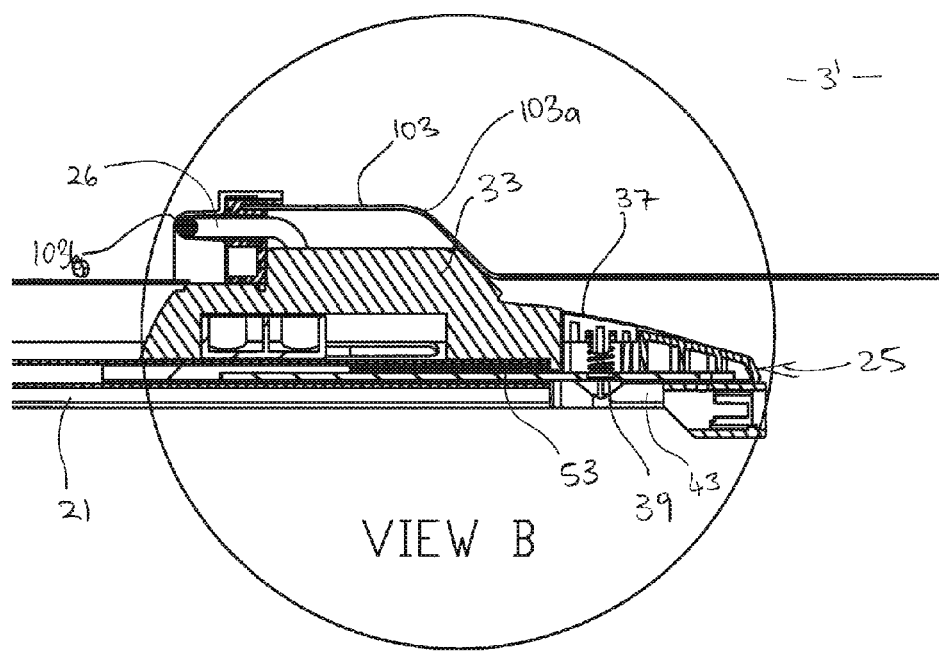
FIG. 19 is an enlargement section view of the securing assembly detail B from FIG. 17.

In a final step shown in FIG. 14(*iv*) and FIGS. 16(*i*) to 16(*iii*), the aligned front end 3*a* of the carrier 3 drops down onto the securing assembly 25 so that the locating projection 36 on the housing 33 of the securing assembly 25 is received by an enlarged locating portion 103*a* of the recess 103 (FIGS. 17 and 19). The slidable assembly 35 is then adjusted into the engaged position by depressing the button 37 and sliding the slidable assembly 35, and thereby the second L-shaped engagement hook 26, rearwards into engagement with an engagement portion 103*b* of the recess. If the button 37 is released by the user, it will return to its upper position to hold the second hook 26 in the engagement position. In this configuration the carrier 3 cannot be removed from the apparatus 5. The slidable assembly 35 can be locked in this engagement configuration using the lock 55.

Figure 18:
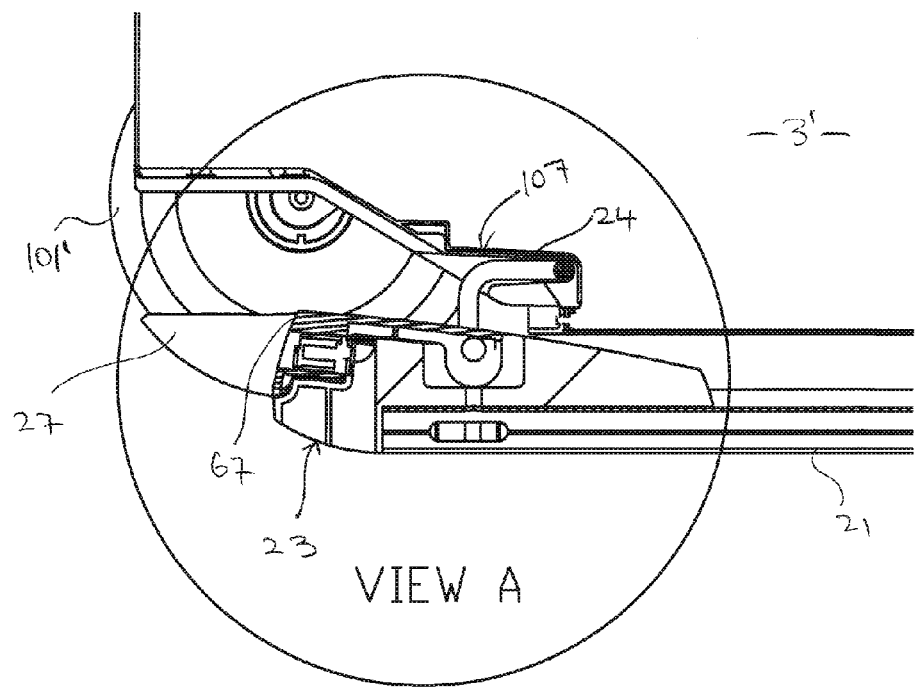
FIG. 18 is an enlargement section view of the guide assembly detail A from FIG. 17.

The section views in FIGS. 17 to 19 show the engaged engagement members 24, 26 in more detail.

From the configuration shown in FIG. 14(*iv*), with the lock 55 unlocked, the button 37 may be depressed and the slidable assembly 26 slid forward to move the second hook 26 out of engagement with the engagement portion of the recess 103*b*, to its disengaged position to allow the carrier to be removed from the apparatus 5.

Carrier Adapter

Use of the apparatus 5 is described above with reference to a custom wheeled carrier 3 that comprises integral recesses 103, 107. However, alternatively, a generic bag, carrier or other article 300, 300' may be attached to the apparatus 5 by attaching a bracket system to the generic article that is compatible with the apparatus. FIGS. 20(*i*) to 21(*iv*) show exemplary embodiments of such a system comprising brackets with recesses for the engagement hooks 24, 26. The system 300 shown in FIGS. 20(*i*) to 20(*iv*) for attaching a generic bag 301 to the apparatus 5 comprises two identical brackets 305, 307, each comprising an aperture 309, 311 for receiving the retaining portion 24*b*, 26*b* of a respective engagement hook 24, 26. One bracket 305 is permanently fastened to a rear side of the bag 301 towards the base of the bag by fasteners 308, while the other bracket 307 is permanently fastened to a rear side of the bag 301 towards the top of the bag 301*a*, by fasteners 308.

FIGS. 21(*i*) to 20(*iv*) show an alternative system 300' for attaching a differently shaped bag or case 301' to the apparatus 5. In those figures, like numbers are used to indicate like parts, but with the addition of a prime symbol (').

In the exemplary systems, the bags 301, 301' themselves comprise guide projections 303, 303' at the bottom rear of the bag 301, 301' for guiding the bag onto the guide assembly 23. An alternative system may comprise two different attachment brackets, and one of the two brackets may comprise two spaced apart guide projections or wheels for receipt by the guide assembly 23. Such a system would have application for a generic bag without compatibly spaced wheels or projections.

The guide assembly 23 and/or the securing assembly 25 may be adjustable and fixable at various positions along the main bar 21 to adjust the distance between the guide assembly 23 and the securing assembly 25 and, therefore, the distance between the engagement hooks 24, 26, to accommodate articles with differently spaced recesses 103, 107

Attachment to a Golf Cart

FIG. 22 shows an alternative embodiment carrier 401 for carrying golf clubs and accessories, and a corresponding apparatus 405 for attaching the carrier 401 to a vehicle. The carrier 401 has a body 403 with front doors 406, and a removable lid 407. The carrier 403 has smaller wheels 411 than the wheels 101 of the carrier in FIGS. 1 to 16. The guide assembly 423 and ledge 431 are sized and shaped to accommodate the smaller wheels 411. Otherwise, features and functionality are the same as described above.

The vehicle to which the apparatus 5, 405 is secured may comprise a ride-on golf cart, a push cart, or other type of cart.

FIGS. 23 to 26 show four embodiment mounting apparatuses 505, 605, 705, 805 attaching the carrier 401 of FIG. 22 to a ride-on golf cart 509 in an upright configuration. These embodiments all comprise a fixed lower hook, 524, 624, 724, 824, and a movable upper hook 526, 626, 726, 826, which work substantially as described above in relation to the first embodiment, to secure the carrier 22 to the cart.

Figure 25:
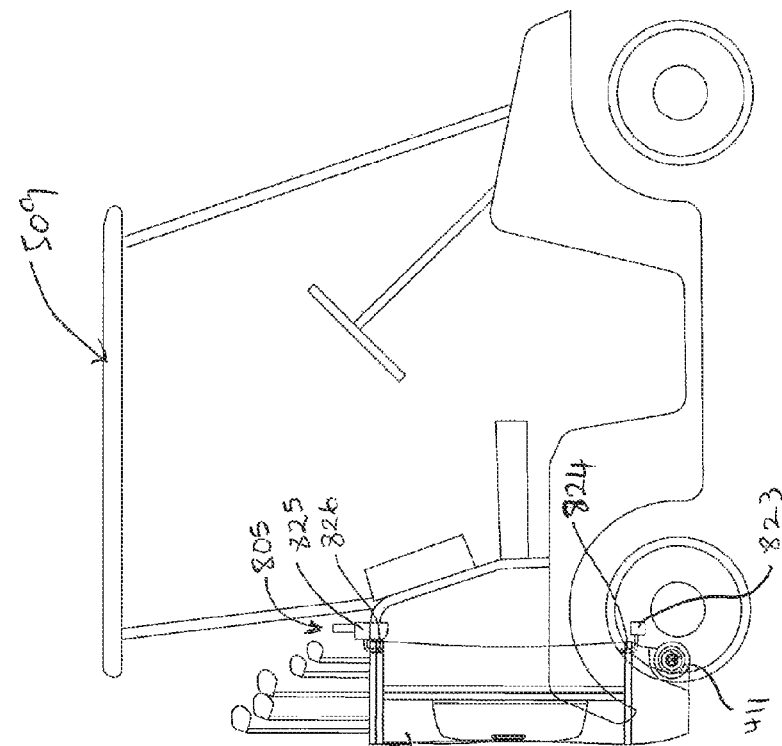
FIG. 25 is a right side elevation view of the carrier of FIGS. 22 to 24 mounted to a ride on golf cart according to a further alternative embodiment mounting.
Figure 26:
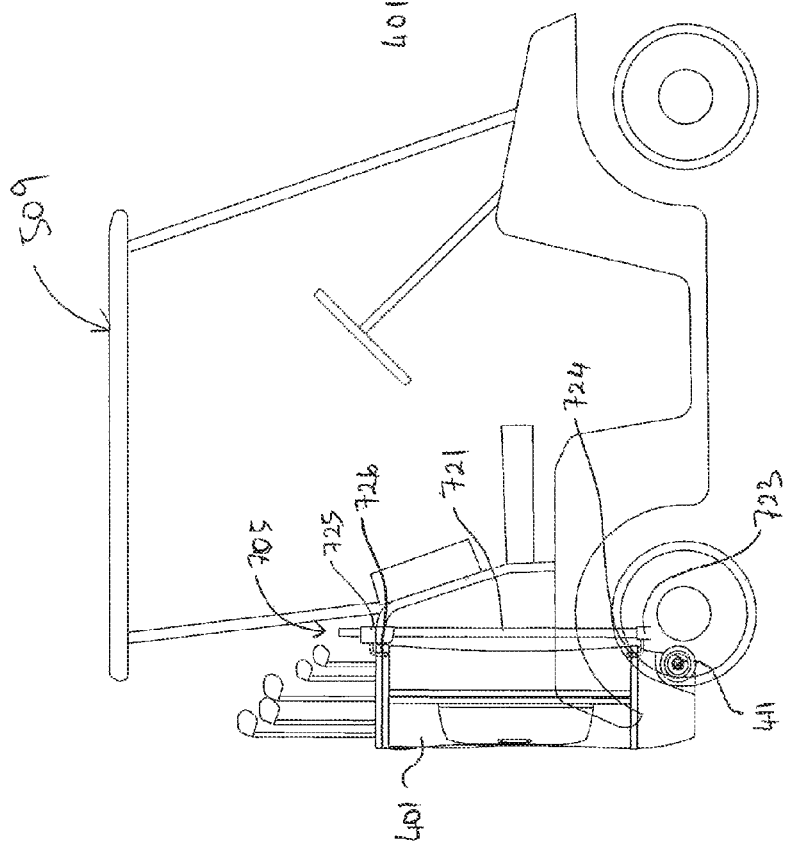
FIG. 26 is a right side elevation view of the carrier of FIGS. 22 to 25 mounted to a ride on golf cart according to yet a further alternative embodiment mounting.

The arrangements 505, 705 in FIGS. 23 and 25 comprise a longitudinal main bar 521, 721 that is attached to a rear of the golf cart. Alternatively, the attachment arrangements 605, 805 may not comprise a longitudinal main bar 21. As shown in FIGS. 24 and 26, the upper and lower hook arrangements 523, 625, 823, 825 may instead be may be attached directly to a rear of the golf cart 509.

The lower hook arrangement 523, 623 preferably comprises a guide assembly and ledge 531, 631 substantially as described above in relation to the first embodiment, for guiding the wheels 411 of the carrier and aligning a respective carrier aperture with the lower hook 524, 624 (FIGS. 23 and 24). Alternatively, the lower hook arrangement 723, 823 may not have a guide assembly and instead may only comprise a fixed lower hook 724, 824, as shown in FIGS. 25 and 26.

Figure 27:
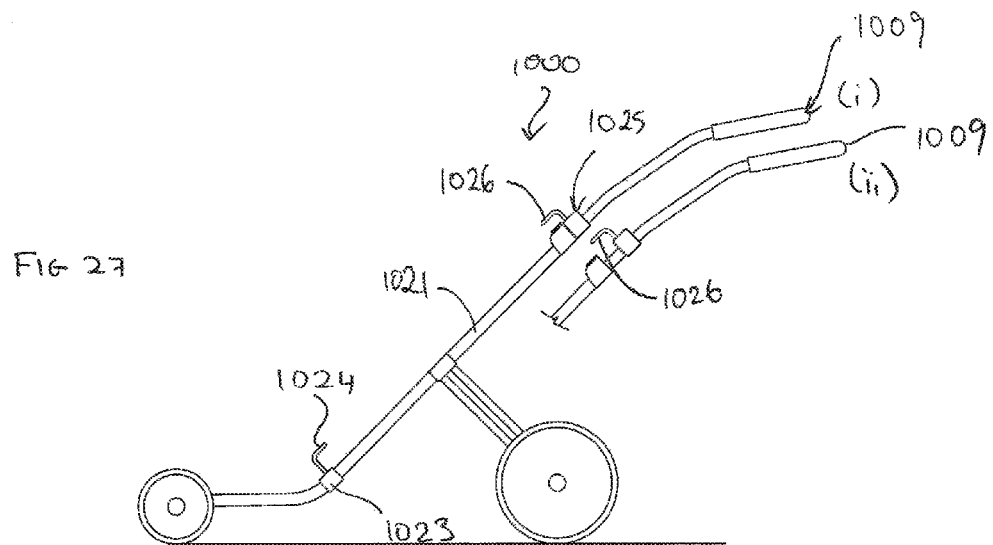

FIGS. 27(*i*) to 30 show two exemplary embodiment mounting arrangements 900, 1000 for attaching the carrier 401 of FIG. 22 to a golf push cart 909, 1009. Both embodiments comprise a lower attachment 923, 1023 with a fixed hook 924, 1024, and an upper attachment 925, 1025 with a hook 926, 1026 that is movable towards and away from the lower hook 924, 1024 to secure and release the carrier 401 from the push cart 909, 1009. The body of the push cart 909, 1009 forms the longitudinal member 921, 1021 between the upper and lower hooks 926, 1026, 924, 1024.

Figure 28:
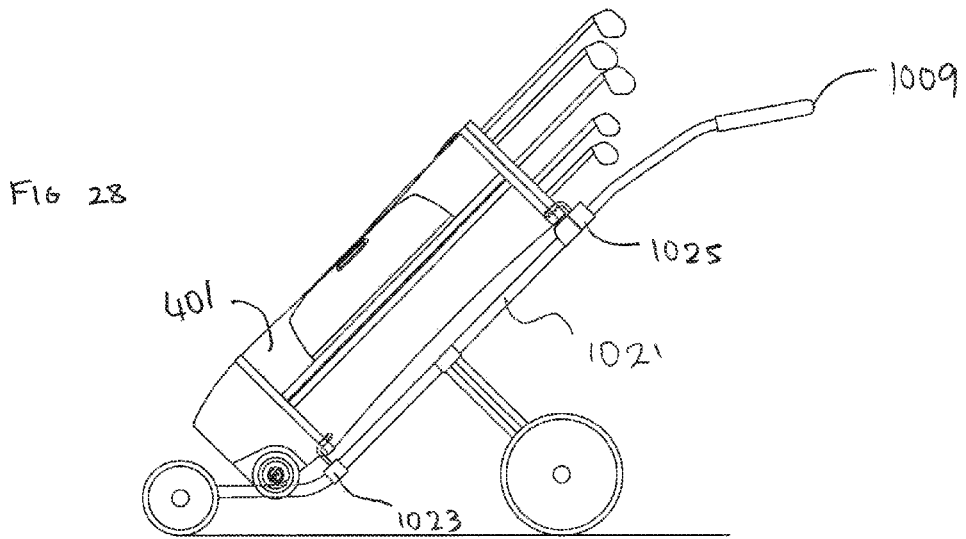
FIG. 28 is a left side elevation view of the golf push cart of FIG. 27(i), with the carrier of FIGS. 22 to 26 secured to the push cart.
Figure 29:
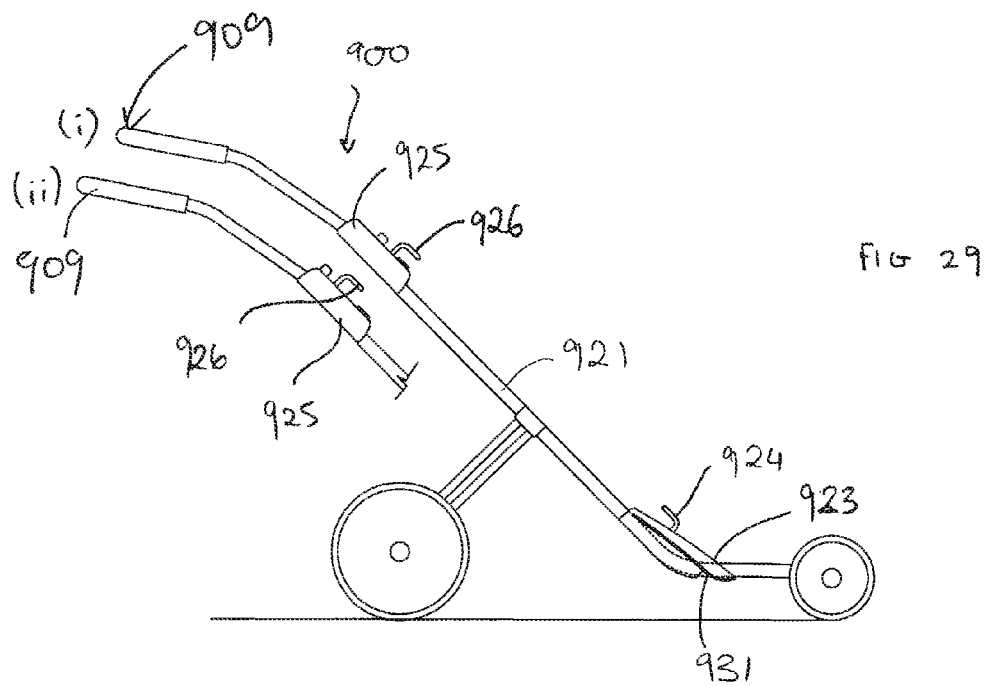
Figure 30:
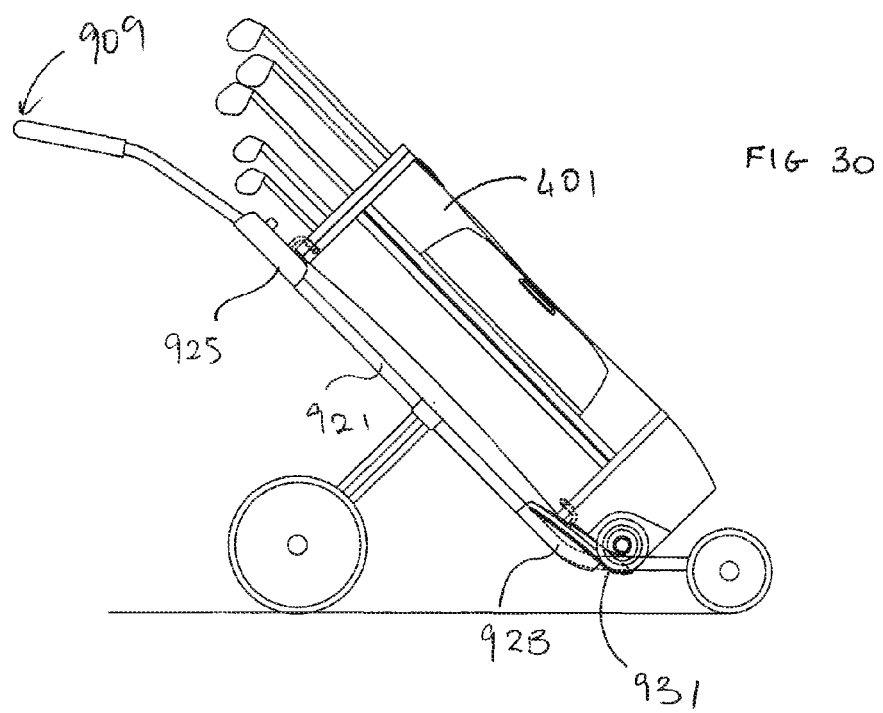
FIG. 30 is a left side elevation view of the golf push cart of FIG. 29(i), with the carrier of FIGS. 22 to 26 secured to the push cart.

The lower attachments 1023, 923 of the push cart mounting arrangements 900, 1000 may comprise a guide assembly 923 and ledge 931 substantially as described above in relation to the first embodiment, for guiding the wheels 411 of the carrier and aligning respective carrier aperture with the lower hook 924 (FIGS. 29(*i*) and 30). Alternatively, the lower hook arrangement 1023 may not have a guide assembly and instead may only comprise a fixed lower hook 1024, as shown in FIGS. 27 and 28.

Materials

In an exemplary embodiment, the main bar 21 comprises aluminium, the two engagement hooks 24, 26 are bent steel rods, and the slide plate 45 comprises steel or aluminium. The guide assembly 23, slide housing 33, slide blocks 47, 49, slide end portion 1, button 37, and cam levers 67, 73 preferably comprise plastic, for example, polypropylene, Nylon, ABS, or another suitable polymer. However, the parts may comprise other suitable materials or a combination of one or more materials, and suitable materials would be apparent to a person skilled in the art.

Preferred embodiments of the invention have been described by way of example only and modifications may be made thereto without departing from the scope of the invention.

For example, rather than being substantially L-shaped hooks, the engagement members may comprise otherwise shaped hooks, or T-shaped members. The first and second engagement members 24, 26 are shown as being identical oppositely oriented members, but they may instead be differently shaped members, and/or they may have the same orientation, for example if the members are T-shaped. In a further alternative embodiment, the engagement members may comprise recesses configured to engage protrusions or hooks on the article.

The securing assembly 25 is described as having two springs between the slide block 49 and the housing 33. However, alternatively the securing assembly may comprise only one spring between the slide block 49 and the housing 33, or more than two springs.

The exemplary central guide member 27 shown in the figures is shaped to allow the wheels 101 of the carrier 3 to be placed on the front end of the guide ledges 31 at a sideways angle up to about 23 degrees. However, alternatively the guide assembly may be configured to enable the carrier to be placed on the front end of the guide ledges 31 at a greater sideways angle, for example up to about 30 degrees, or may only permit a smaller sideways angle, for example up to about 20 degrees.

Rather than ledges, the guide assembly 23 may comprise channels or recesses for receiving the wheels or guide projections on the article.

The brackets 305, 307, 305', 307' in the attachment system 300 are described as permanently fastened to a generic bag 300, 300' or other article. Alternatively, the brackets 305, 307, 305', 307' may be removable, for example they may be strapped to the bag. The first and second attachment brackets 305, 307, 305', 307' may be provided on a single member that is attachable to an article such that the distance between the bracket recesses 309, 311, 309', 311' is fixed.

The components described above have been shown and described for an exemplary wheeled carrier 3. The wheeled carrier may be a golf equipment carrier with compartments for supporting golf clubs. However, other wheeled carriers and articles for attachment to the apparatus are envisaged without departing from the scope of the invention. By way of example, the above described recess and/or guide configuration may be applied to a piece of luggage, an alternative case or bag such as a light wheeled roof box, tool or equipment case such as a sports, fishing or camera case, a trolley, a baby buggy, or another article with attached or integral features for engaging the engagement members on the apparatus. In addition, embodiments of the present invention need not contain all of the features describe above and could have one or a combination of the described features, and may have other additional features.

The invention claimed is:

1. An apparatus for attaching an article to a vehicle, the apparatus comprising:
   a first engagement member;
   a second engagement member spaced from the first engagement member along a longitudinal axis and that is slidable relative to the first engagement member along the longitudinal axis between an engaged position and a disengaged position;
   the apparatus having a transverse plane extending generally through the apparatus and coincident with the longitudinal axis, wherein the first and second engagement members each comprise a retaining portion that is non-perpendicular relative to the transverse plane and that is configured to be received by respective engagement features on the article to substantially prevent movement of the article away from the apparatus;
   a main member that defines the longitudinal axis,
   wherein the first engagement member is operatively connected to the main member at or towards a first end of the main member and the second engagement member is operatively connected to the main member at or towards a second end of the main member and is slidable in a longitudinal direction of the main member;
   a second end part that is fixed to the main member at or towards the second end of the main member; and
   a slidable assembly that is slidable relative to the second end part between an engagement position and a disengagement position,
   wherein the second engagement member is provided on the slidable assembly, and
   wherein the second end part comprises a cam surface and an adjuster that is movable between i) a first position abutting the cam surface to substantially prevent sliding of the slidable assembly relative to the second end part, and ii) a second position wherein the slidable assembly is slidable relative to the cam surface.

2. The apparatus according to claim 1, wherein the adjuster is biased into its first position.

3. The apparatus according to claim 2, wherein the adjuster is held in its second position when the slidable assembly is positioned intermediate its engagement position and its disengagement position.

4. The apparatus according to claim 1, wherein the adjuster comprises a button, and depressing the button moves the adjuster to its second position.

5. The apparatus according to claim 1, wherein the cam surface is configured such that:
   with the slidable assembly in the engagement position and the adjuster in its first position, the adjuster abuts a first end portion of the cam surface;
   with the slidable assembly in the disengagement position and the adjuster in its first position, the adjuster abuts an opposite second end portion of the cam surface; and
   with the slidable assembly intermediate its engagement and disengagement positions and the adjuster in its second position, the adjuster abuts an intermediate third portion of the cam surface.

6. The apparatus according to claim 5, wherein the third portion of the cam surface is substantially perpendicular to the first and second portions of the cam surface.

7. The apparatus according to claim 1, comprising a main member defining the longitudinal axis, wherein the first engagement member is operatively connected to the main member at or towards a first end of the main member and the second engagement member is operatively connected to the main member at or towards a second end of the main member and is slidable in a longitudinal direction of the main member, the apparatus comprising a second end part that is fixed to the main member at or towards the second end of the main member, and a slidable assembly that is slidable relative to the second end part between an engagement position and a disengagement position, wherein the second engagement member is provided on the slidable assembly, wherein the second end part houses at least a major portion of the slidable assembly.

8. The apparatus according to claim 1, wherein the slidable assembly is biased towards its engagement position.

9. The apparatus of claim 8 comprising a compression spring provided between the slidable assembly and the second end part to bias the slidable assembly towards its engagement position.

10. The apparatus according to claim 1, wherein the slidable assembly comprises a visual warning feature that is visible when the slidable assembly is in its disengaged position, and that is obscured by the second end part when the slidable assembly is in its engagement position.

11. An apparatus for attaching an article to a vehicle, the article comprising two spaced apart projections, the apparatus comprising: a guide configured to receive the two projections, and a retention member;
wherein the apparatus is configured such that when the projections are positioned at or toward a first end of the guide, the article is pivotable sideways relative to the guide, and such that when the projections are positioned at or toward a second end of the guide, the article is aligned in a desired orientation and substantially prevented from pivoting sideways with the retention member substantially preventing movement of the article outwards from the guide member.

12. An article for mounting to the apparatus of claim 1, wherein the apparatus comprises a main member that defines the longitudinal axis, wherein the first engagement member is operatively connected to the main member at or towards a first end of the main member and the second engagement member is operatively connected to the main member at or towards a second end of the main member and is slidable in a longitudinal direction of the main member, wherein a first side of the article comprises: a first attachment feature configured to receive at least a portion of the first engagement member; and a second attachment feature that is spaced from the first attachment feature in a longitudinal direction of the article and configured to receive at least a portion of the second engagement member.

13. The article according to claim 12, wherein the first and second attachment features each comprise a recess.

14. The article according to claim 12, wherein the article is a wheeled carrier.

15. The article according to claim 12, wherein the article is a golf carrier.

16. A system for mounting an article to the apparatus of claim 1, comprising a first attachment bracket having a first attachment feature configured to receive at least a portion of the first engagement member, and a second attachment bracket having a second attachment feature configured to receive at least a portion of the second engagement member, wherein the first attachment and the second attachment bracket are configured to be fixed to the article.

17. The system according to claim 16, wherein the article is a bag and the first attachment bracket is adapted to receive a first portion of the bag, and the second attachment bracket is adapted to receive a second portion of the bag.

18. An article for mounting to the apparatus of claim 11, comprising two guide projections that are spaced apart in a transverse direction of the article and configured to be received by the guide of the apparatus.

19. The article according to claim 18, wherein the article is a golf carrier.

* * * * *